United States Patent
Doi

[11] Patent Number: 5,181,553
[45] Date of Patent: Jan. 26, 1993

[54] AIR CONDITIONER SYSTEM FOR AUTOMOTIVE VEHICLE WITH MINIMUM DISCHARGE TEMPERATURE FOR REAR FOOT OUTLET

[75] Inventor: Koichi Doi, Kanagawa, Japan

[73] Assignee: Nissan Motor Company, Limited, Yokohama, Japan

[21] Appl. No.: 657,970

[22] Filed: Feb. 20, 1991

Related U.S. Application Data

[63] Continuation of Ser. No. 526,688, May 22, 1990, abandoned, which is a continuation of Ser. No. 363,304, Jun. 8, 1989, abandoned, which is a continuation of Ser. No. 190,120, May 5, 1988, abandoned.

[30] Foreign Application Priority Data

Jun. 15, 1987 [JP] Japan ................. 62-148366

[51] Int. Cl.[5] ............... F25B 29/00; B06H 3/00; B61D-27/00
[52] U.S. Cl. .................... 165/22; 165/42; 165/43; 165/24; 454/75; 237/12.3 A; 237/2 A
[58] Field of Search .............. 165/16, 22, 42, 43; 98/2.01, 2.03; 237/2 A, 12.3 A, 12.3 B; 236/13, 49; 62/244; 454/75

[56] References Cited

U.S. PATENT DOCUMENTS

| | | | |
|---|---|---|---|
| 4,537,245 | 8/1985 | Nishimura et al. | 165/43 |
| 4,665,971 | 5/1987 | Sakurai | 165/22 |
| 4,690,203 | 9/1987 | Iida | 237/12.3 B |
| 4,718,244 | 1/1988 | Kobayashi | 62/244 |
| 4,762,169 | 8/1988 | Andersen et al. | 165/22 |
| 4,901,788 | 2/1990 | Doi | 165/24 |
| 5,016,704 | 5/1991 | Ono | 165/1 |

FOREIGN PATENT DOCUMENTS

| | | | |
|---|---|---|---|
| 0085711 | 5/1983 | Japan | 165/22 |
| 58-218420 | 12/1983 | Japan | |
| 0001523 | 1/1986 | Japan | 165/22 |

Primary Examiner—John K. Ford
Attorney, Agent, or Firm—Foley & Lardner

[57] ABSTRACT

An air conditioner system for automotive vehicles includes a front air duct for discharging a conditioning air near the occupant of the front seat in a vehicular cabin, and a rear air duct for discharging the conditioning air near the occupant of the back seat in the vehicular cabin. The rear air duct has a vent nozzle for blowing the conditioning air near the passenger's head and a foot nozzle for blowing the conditioning air against the passenger's feet. The air conditioner system includes a door which closes the foot nozzle when temperature of the conditioning air is lower than a predetermined temperature, so as to restrict overly cool air from being discharged from the foot nozzle.

11 Claims, 20 Drawing Sheets

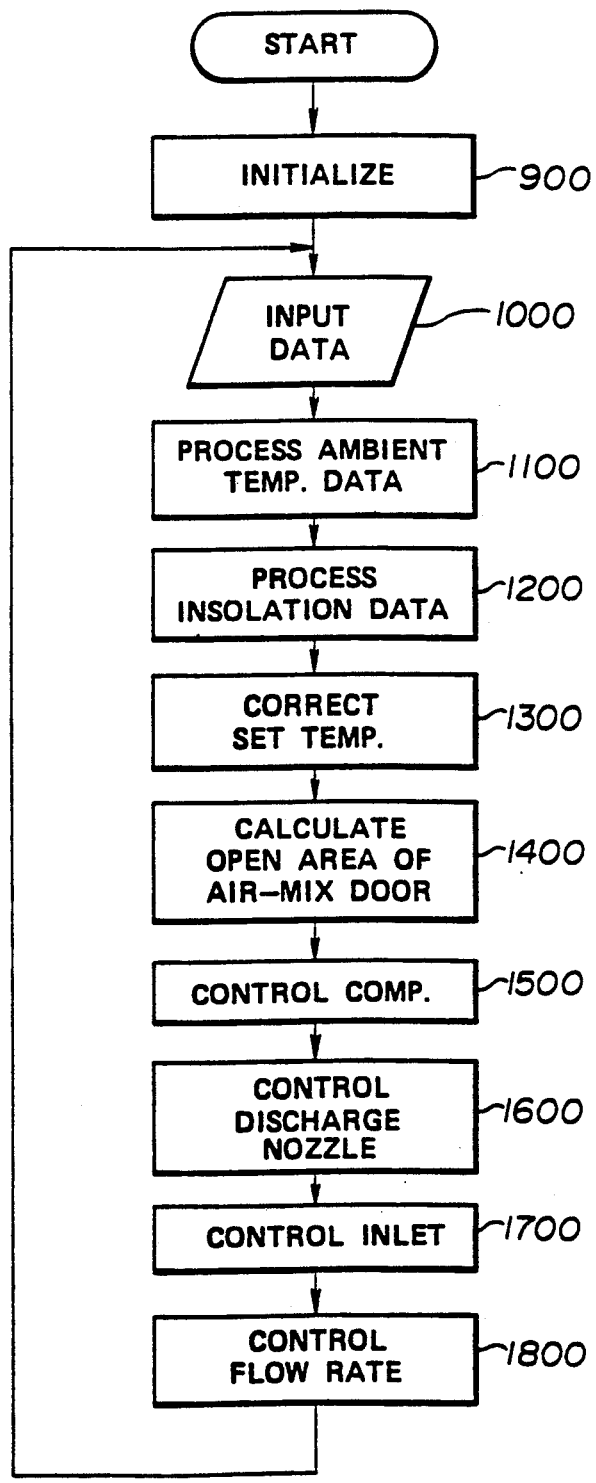

AIR CONDITIONER SYSTEM FOR AUTOMOTIVE VEHICLE WITH MINIMUM DISCHARGE TEMPERATURE FOR REAR FOOT OUTLET

This application is a continuation of application Ser. No. 07/526,688, filed May 22, 1990 now abandoned which is a continuation of application Ser. No. 07/363,304, filed Jun. 8, 1989 now abandoned which is a continuation of application Ser. No. 07/190,120, filed May 5, 1988 now abandoned.

BACKGROUND OF THE INVENTION

1. Field of The Invention

The present invention relates generally to an air conditioner system for automotive vehicles. More specifically, the invention relates to an air conditioner system in which conditioning air is discharged from front and rear discharge nozzles to blow on the vehicular occupants in the front and rear seats. Further specifically, the invention relates to an air conditioner system in which discharge air temperature of the rear discharge nozzle can be adjusted.

2. Description of The Prior Art

Various automatic air conditioner systems, which automatically adjust discharge air temperature to achieve comfortable conditions in a vehicular cabin, have been proposed. One such automatic air conditioner system was disclosed in the Japanese Patent First Publication (Jikkai) Showa 58-218420.

The aforementioned air conditioner system does not have only front discharge nozzles but also, rear discharge nozzles which discharge conditioned air therefrom toward the occupants of the front and back seats in the vehicular cabin. If this system is provided with a temperature setting unit which adjusts the temperature of the conditioned air discharged from the rear discharge nozzles independently of that from the front discharge nozzles, it is possible to increase the comfort of the occupants of the back seat. For example, when the ambient air temperature is relatively high, temperature of the air discharged from the rear discharge nozzle is decreased by the temperature setting unit, so that the occupant is cooled.

However, in such a system, if the ambient air perataure is changed, the occupant in the back seat must operate the temperature setting unit again. Otherwise, when the ambient air temperature decreases after the temperature setting unit is set, cool air is discharged from rear foot nozzles against the feet of the occupant in the back seat, which may cause discomfort.

SUMMARY OF THE INVENTION

It is therefore a principal object of the present invention to provide an air conditioner, system for an automotive vehicle, in which conditioned air less than a predetermined temperature is not discharged from the rear foot nozzle so as to increase the comfort of the occupants in the back seat of a vehicular cabin.

In order to accomplish the aforementioned and other specific objects, an air conditioner system for an automotive vehicle includes a door which closes a rear foot nozzle when temperature of the conditioned air discharged therefrom becomes lower than a predetermined temperature.

According to one aspect of the present invention, the air conditioner system for automotive vehicles comprises:

conditioned air passage means defining a conditioning air path which branches into front and rear air paths, the rear air path including first and second air outlets which open to the vehicular cabin near the back seat for discharging conditioning air in the vicinity of the occupant of the back seat in the vehicular cabin;

conditioned air generating means disposed within the conditioning air passage means, the conditioned air generating means including a cooling unit for cooling the air flowing through the conditioned air path and a heating, unit for heating the air flowing through the conditioned air path, the cooling and heating units being cooperative for generating conditioned air of a desired temperature; and means for restricting the conditioned air from being discharged from the second air outlet when the temperature of the conditioned air is lower than a predetermined temperature.

The conditioned air generating means may include an air-mix door for changing path area, through which the air is introduced into the heating unit, the path area being changeable between a fully open position at which the path area is maximum and a fully closed position at which the path area is at a minimum. The restricting means may operate on the basis of the path area defined by the air-mix door. The restricting means may comprise a door associated with the second air outlet operable between a first position in which the door fully closes the second air outlet and a second position in which the door fully opens the second air outlet. The door may close the second air outlet when the temperature of the air introduced into the rear air path is lower than a predetermined temperature. The second air outlet is preferably a rear vent nozzle.

According to another aspect of the invention, the air conditioner system comprises:

conditioned air passage means defining a conditioned air path which branches into front and rear air paths, the rear air path including first and second air outlets which open into the vehicular cabin near the back seat for discharging the conditioned air in the vicinity of the occupant of the back seat in the vehicular cabin;

conditioned air generating means disposed within the conditioned air passage means, the conditioned air generating means including a cooling unit for cooling the air flowing through the conditioned air path and a heating unit for heating the air flowing through the conditioned air path, the cooling and heating units being cooperative for generating conditioned air of a desired temperature;

a door associated with the second air outlet operable between a closed position in which the door fully closes the second air outlet, and an open position in which the door fully opens the second air outlet;

control means for controlling the door on the basis of the temperature of the conditioned air introduced into the rear air path.

The conditioned air generating means may include an air-mix door for changing path area, through which the air is introduced into the heating unit, the path area being changeable between a fully open position at which the path area is maximum and a fully closed position at which the path area is minimum. The control means may operate on the basis of the path area defined by the air-mix door. The control means may cause the door to close the second air outlet when temperature of the air introduced into the rear air path is lower than a predetermined temperature. The air conditioner system may further comprise a sensor means for monitoring temperature of the air discharged from the cooling unit for producing a sensor signal indicative of temperature of the air discharged therefrom. The path area may be determined on the basis of the sensor signal. The second air outlet is preferably a rear vent nozzle.

BRIEF DESCRIPTION OF THE DRAWINGS

FIG. 11 is a flow chart showing a process for controlling the air conditioner system of FIG. 1 by the front control unit of FIG. 7;

DESCRIPTION OF THE PREFERRED EMBODIMENT

Figure 1:
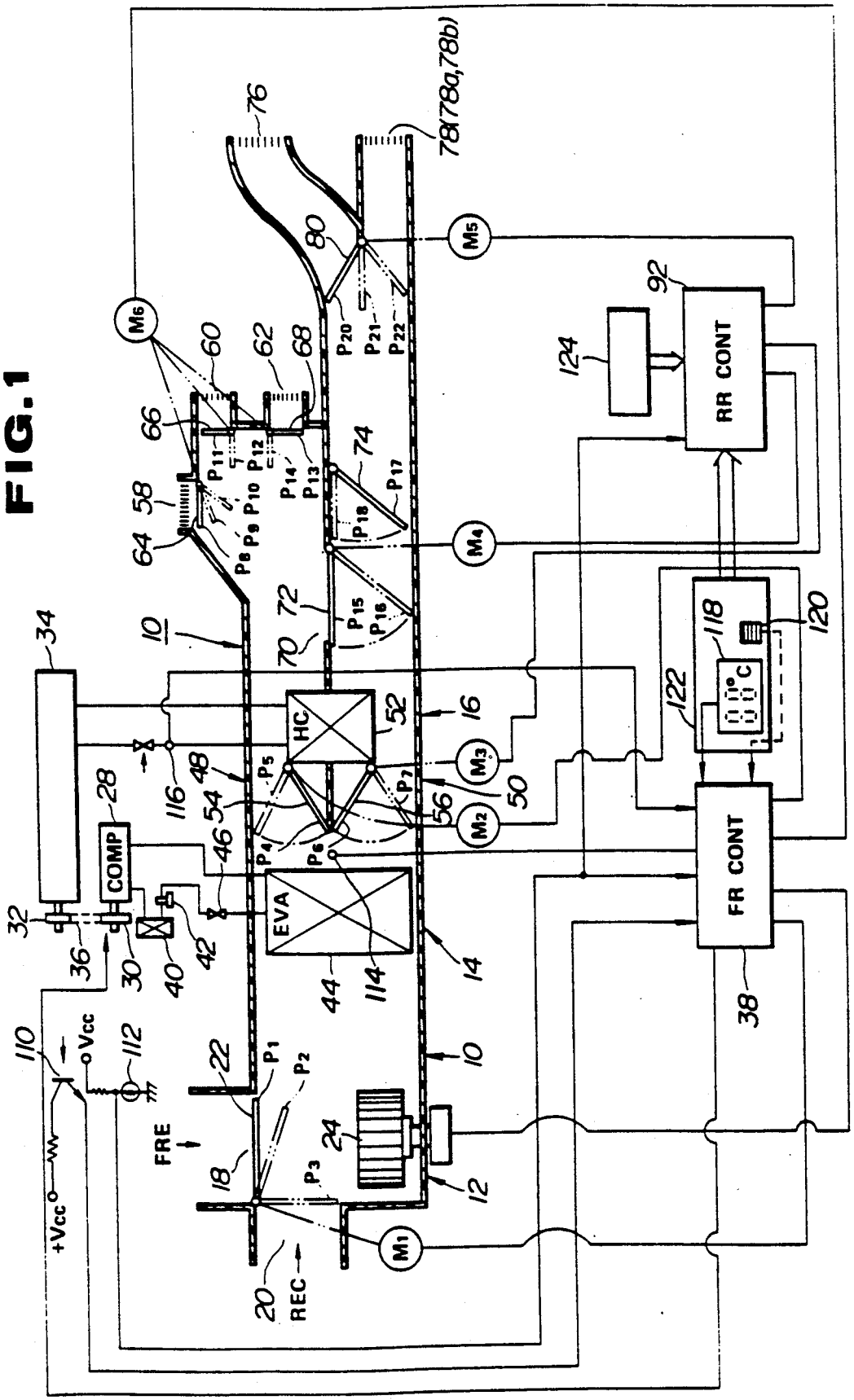
FIG. 1 is a schematic view of the preferred embodiment of an air conditioner system according to the present invention.

Referring now to the drawings, particularly to FIG. 1, the preferred embodiment of an air conditioner, system for an automotive vehicle includes a conditioned air duct assembly 10 which comprises a blower housing 12, a cooler unit housing 14 and an air mixing unit housing 16.

The blower housing 12 defines air inlets 18 and 20. The inlet 18 draws air from the outside of the vehicular body. The air inlet 18 will be referred to as "fresh air inlet". On the other hand, the air inlet 20 draws air from the vehicular cabin. The air inlet 20 will be referred to as "recirculation air inlet". The fresh air inlet 18 and the recirculation air inlet 20 are selectively open and closed by means of an air intake door 22. The air intake door 22 is hinged on the wall of the blower housing 12 to be operated between a recirculation air mode position P1 and fresh air mode position P3. At the recirculation air mode position P1 of the air intake door 22, the fresh air inlet 18 is closed and the recirculation air inlet 20 is fully opened. On the other hand, at the fresh air mode position P3 thereof, the recirculation air inlet 20 is closed and the fresh air inlet 18 is fully opened. Therefore, when the air intake door 22 is disposed at the position P3, only the fresh air is introduced into the blower housing 12, and when it is disposed at the position P1, only the air from the vehicular cabin is introduced thereto. Moreover, when the air intake door 22 is disposed at a position P2 between the positions P1 and P3, both of the fresh air and the air from the vehicular cabin are introduced into the blower housing 12. The air intake door 22 is driven by an actuator motor M1.

The blower housing 12 also defines a space for a blower 24. The blower 24 is disposed at a location beneath the fresh air inlet 18. The air introduced through the fresh air inlet 18 or the recirculation air inlet 20, is blown against an evaporator 44 by means of the blower 24. Refrigerant in the evaporator 44 is supplied to a compressor 28. A pulley 30 is fixed to the rotary shaft of the compressor 28, and a pulley 32 is fixed to the rotary shaft of an engine 34. Moreover, a belt 36 is stretched over the pulleys 30 and 32, so that the compressor 28 can be driven by the engine 34. As will be described hereafter, when a magnetic clutch is turned on, in response to a control signal produced from a front control unit 38, the driving force of the engine 34 is supplied to the compressor 28 by means of the belt 36. The refrigerant supplied to the compressor 28 is changed thereby into high-temperature, high-pressure gas, and thereafter is supplied to a condenser 40 to be condensed. The refrigerant liquefied in the condenser 40 is stored in a liquid tank 42. The liquid tank 42 is in communication with the evaporator 44, which is housed in the cooler unit housing 14, via an expansion valve 46. By adjusting opening angle of the expansion valve 46, a difference between the pressures in the liquid tank 42 and the evaporator 44 can be produced. Therefore, the evaporator 44 absorbs heat of the air flow from the blower 24 which is directed against the evaporator 44, when the liquid refrigerant in the liquid tank 42 is introduced into the evaporator 44 to be vaporized. As a result, the temperature of the air surrounding the evaporator 44, i.e. temperature of the air flow directed from the blower 24 against the evaporator 44, is decreased.

The conditioned air duct assembly 10 branches behind the evaporator 44. The air flow cooled by the evaporator 44 is introduced into respective conditioned air passages 48 and 50 for supplying the air to the front and rear vehicular occupants, which will be hereafter referred to as "front air passage" and "rear air passage". The air introduced into the front and rear air passages 48 and 50 is blown against a heater core 52 housed in the air mixing unit housing 16. The proportion of air flow passing through the heater core 52 to that bypassing the latter is determined by front and rear air-mix doors 54 and 56 which are provided within the front and rear air passages 48 and 50, respectively. Cooling air from the engine 34 is supplied to the heater core 52, and the temperature of the cooling water increases as the temperature of the engine 34 increases. The front air-mix door 54 is hinged on the wall of the heater core 52 to be operated between positions P4 and P5. When the front air-mix door 54 is disposed at the position P4, the air cooled by the evaporator 44 does not pass through the heater core 52, so the temperature of the air passing through the front air passage 48 is not increased. On the other hand, when the front air-mix door 54 is disposed at the position P5, the air cooled by the evaporator 44 passes through the heater core 52, so that the temperature thereof is increased. Therefore, in accordance with opening angle of the front air-mix door 54, the amount of the air passing through the heater core 52 can be changed for adjusting the temperature of the air passing through the front air passage 48. The rear air-mix door 56 is also hinged on the wall of the heater core 52 to be operated between positions P6 and P7. When the rear air-mix door 56 is disposed at the position P6, the air cooled by the evaporator 44 does not pass through the heater core 52, so that the temperature of the air passing through the rear air passage 50 is not increased. On the other hand, when the rear air-mix door 56 is disposed at the position P7, the air cooled by the evaporator 44 passes through the heater core 52, so that the temperature thereof is increased. Therefore, in accordance with opening angle of the rear air-mix door, the amount of the air passing through the heater core 52 can be changed for adjusting the temperature of the air passing through the rear air passage 50. The front and rear air-mix doors are driven by means of actuators M2 and M3, respectively.

The front air passage 48 defines a front defroster nozzle 58, a front vent nozzle 60 and a front foot nozzle 62. The defroster, vent and foot nozzles 58, 60 and 62 are selectively opened and closed by means of a front defroster door 64, a front vent door 66 and a front foot door 68, respectively. The front defroster door 64 is hinged on the wall of the front air passage 48 to be operated between positions P8 and P10. When the front defroster door 64 is at the position P10, the amount of the air discharged from the front defroster nozzle 58 is maximum. At the position P8, no air is discharged from the front defroster nozzle 58. When the front defroster door 64 is disposed at a position P9 between the positions P8 and P10, a small amount of air is discharged from the front defroster nozzle 64. The front vent door 66 is also hinged on the wall of the front air passage 48 to be operated between positions P11 and P12. When the front vent door 66 is at the position P11, no air is discharged from the front vent nozzle 60. On the other hand, at the position P12, air is discharged from the front vent nozzle 60. In addition, the front foot door 68 is hinged on the wall of the front air passage 48 to be operated between positions P13 and P14. At the position P13 of the front foot door 68, no air is discharged from the front foot nozzle 62. On the other hand, at the position P14 thereof, the air is discharged from the front foot nozzle 62. The front defroster door 64, the front vent door 66 and the front foot door 68 are driven an actuator motor M6.

An air passage 70 is formed in the wall between the front and rear air passages 48 and 50, so that the air passing through the heater core 52 in the rear air passage 50 can be introduced into the front air passage 48. The passage 70 is open and closed by means of a separating door 72. The separating door 72 is hinged on the wall between the front and rear air passages 48 and 50 to be operated between positions P15 and P16. When the separating door 72 is at the position P15, the passage 70 is closed so as to allow the air flow to be discharged from the rear air outlets. At the position P16 thereof, the passage 70 is open so as to introduce all of the air passing through the evaporator 44 and the heater core 52 into the front air passage 48. The rear air passage 50 is provided with a flow rate adjusting door 74, which has a plurality of holes, at a location downstream of the separating door 72. The flow rate adjusting door 74 is hinged on the wall of the rear air duct 50 to be operated between positions P17 and P18. When the flow rate adjusting door 74 is at the position P17, the rear air passage 50 is closed by means of the adjusting door 74, so that the amount of the air passing through the rear air passage 50 is decreased behind the adjusting door 74. The separating door 72 and the flow rate adjusting door 74 are driven by an actuator motor M4.

The rear air passage 50 defines a rear vent nozzle 76 and a pair of rear foot nozzles 78 which will be described hereafter. The rear vent and foot nozzles 76, 78a and 78b respectively are selectively open and closed by means of a selecting door assembly 80. The selecting door assembly 80 is hinged on the wall of the rear air passage 50 to be operated between positions P20 and P22. The selecting door assembly 80 is driven by an actuator motor M5 and comprises a pair of selecting doors 80a and 80b which will be described hereafter. When the selecting door 50 is at the position P20, the rear vent nozzle 76 is closed so as to discharge the air passing though the rear air passage 50 from the rear foot nozzles 78a and 78b. On the other hand, when it is at the position P22, the rear foot nozzles 78a and 78b are closed so as to discharge air from the rear vent nozzle 76. When the selecting door assembly 80 is disposed at a position P21 between the positions 20 and 22, air is discharged from both the rear vent and rear foot nozzles 76, 78a and 78b.

Figure 2:
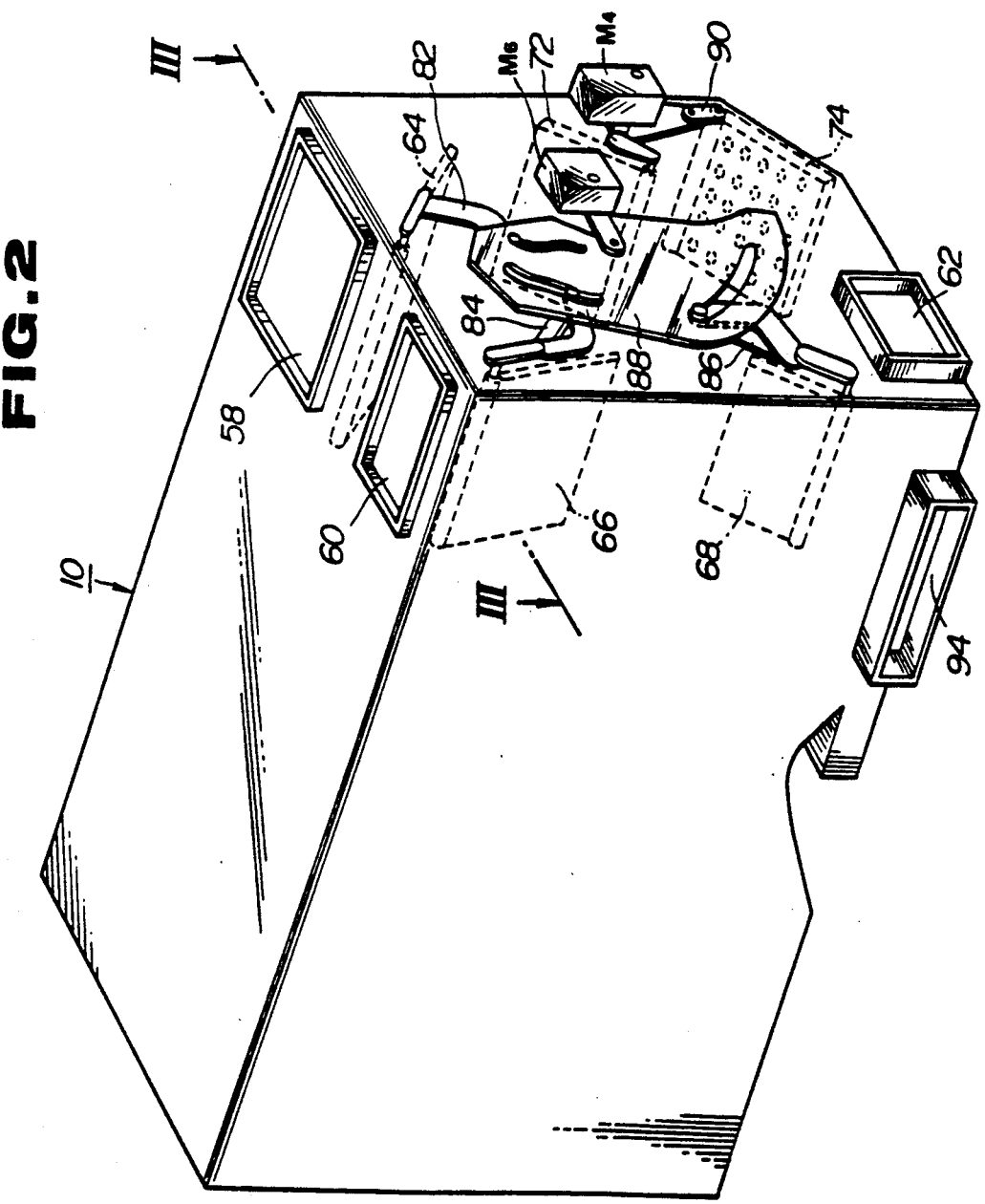
FIG. 2 is a perspective view of the preferred embodiment of a conditioned air duct assembly according to the invention.

As shown in FIG. 2, links 82, 84 and 86 are fixed to the defroster door 64, the front vent door 66 and the front foot door 68, respectively. These links 82, 84 and 86 engage a link plate 88. The link plate 88 is rotated by means of the actuator motor M6, so that the front defroster, front vent and front foot doors 64, 66 and 68 are moved in synchronism with each other. As will be described hereafter, the front control unit 38 shown in FIG. 1 produces a control signal which is supplied to the actuator motor M6. The actuator M6 becomes active in response to the control signal, so that the front defroster, front vent and front foot doors 64, 66 and 68 are moved in synchronism with each other, thereby the air conditioner system can operate in VENT mode, BI-LEVEL mode, HEAT mode or defroster mode.

Figure 3:
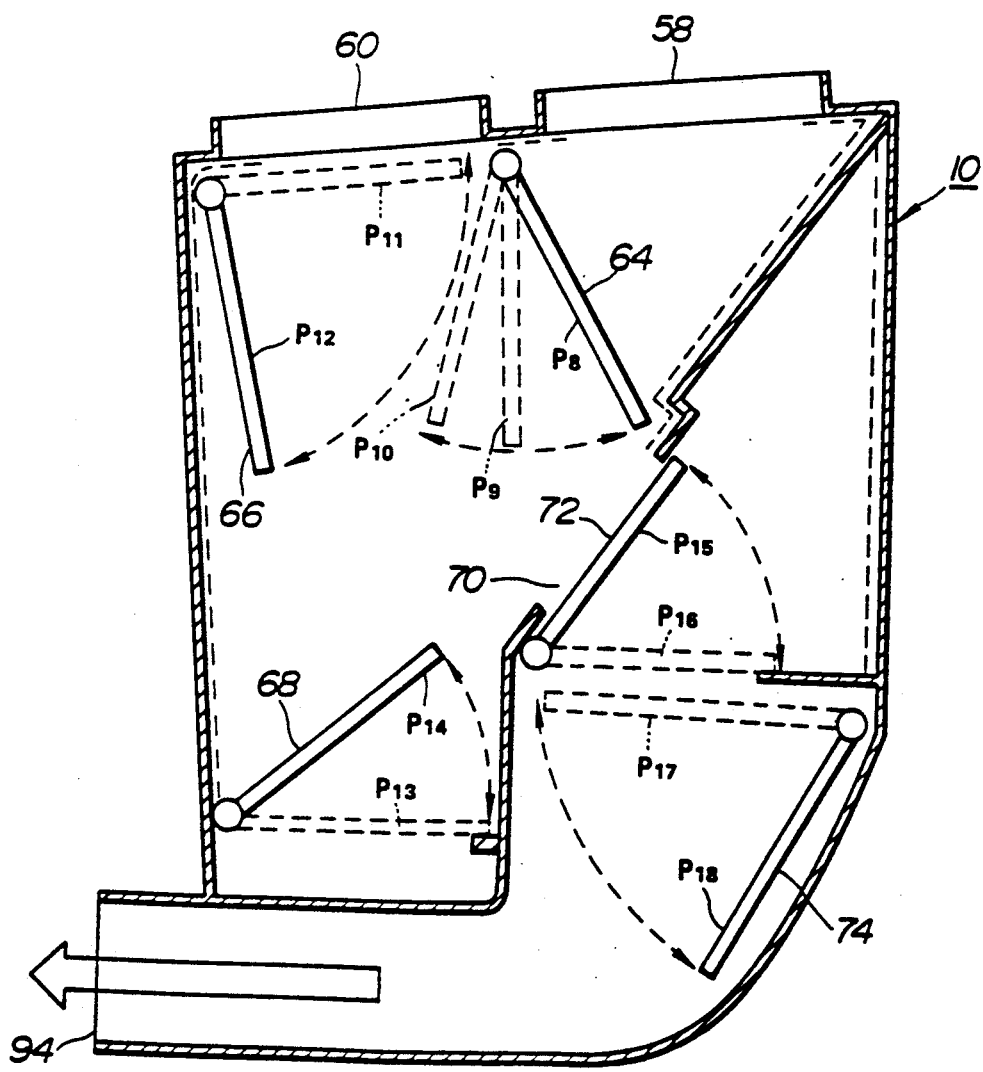
FIG. 3 is a sectional view of the conditioned air duct assembly taken along the line III—III of FIG. 2.

As seen clearly from FIG. 3, when the air conditioner system operates in the VENT mode, the front vent door 66 is positioned at the position P12 so that air is discharged from only the front vent nozzle 60. In the BI-LEVEL mode, the front vent door 66 is positioned at the open position P12, and the front foot door 68 is positioned at the open position P14, so that the air is discharged from both the front vent nozzle 60 and the front foot nozzle 62. In HEAT mode, the front foot door 68 is positioned at the open position P14, and the front defroster door 64 is positioned at the positions P9 or P10, so that the air is discharged from both the front foot nozzle 62 and the front defroster nozzle 58. In defroster (DEF) mode, the front defroster door 64 is positioned at the fully open position P10, so that the air is discharged from only the front defroster nozzle 58.

Figure 4:
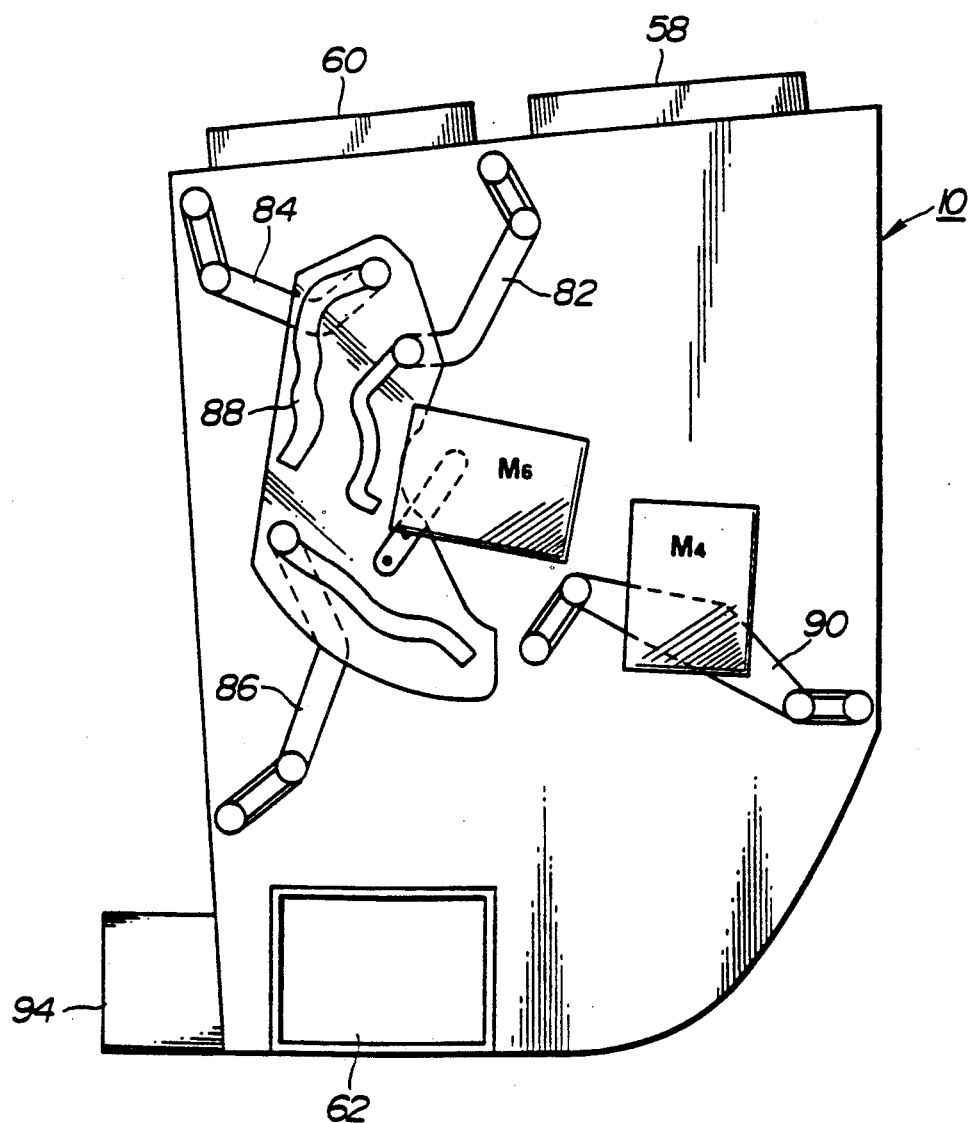
FIG. 4 is a side elevation of the conditioned air duct assembly of FIG. 2.

As shown in FIGS. 2 and 4, the separating door 72 and the flow rate adjusting door 74 are fixed to a link plate 90. The link plate 90 is rotated by means of the actuator motor M4 in response to a control signal produced by a rear control unit 92 which will be described hereafter. As a result, the separating door 72 and the flow rate adjusting door 74 are moved in synchronism with each other, so that the air conditioner system can selectively operate in a fully open mode, an intermediate mode or a fully close mode.

As shown in FIG. 3, when the air conditioner system operates in the full open mode, the separating door 72 is positioned at the position P15 to close the opening 72, and the flow rate adjusting door 74 is positioned at the position P18 to open an opening 94 so as to discharge air from the rear vent nozzle 76 and/or rear foot nozzles 78a and 78b. In the intermediate mode, the separating door 72 is positioned at the position P15 to close the opening 72, and the flow rate adjusting door 74 is positioned at the position P17 so as to decrease the flow rate of the air discharged from the rear nozzles 76, 78a and 78b. In the fully closed mode, the separating door 72 is positioned at the position P16, so that the air is not discharged from the rear nozzles 76, 78a and 78b and all of the air is discharged from the front nozzles 58, 60 or 62.

Figure 5:
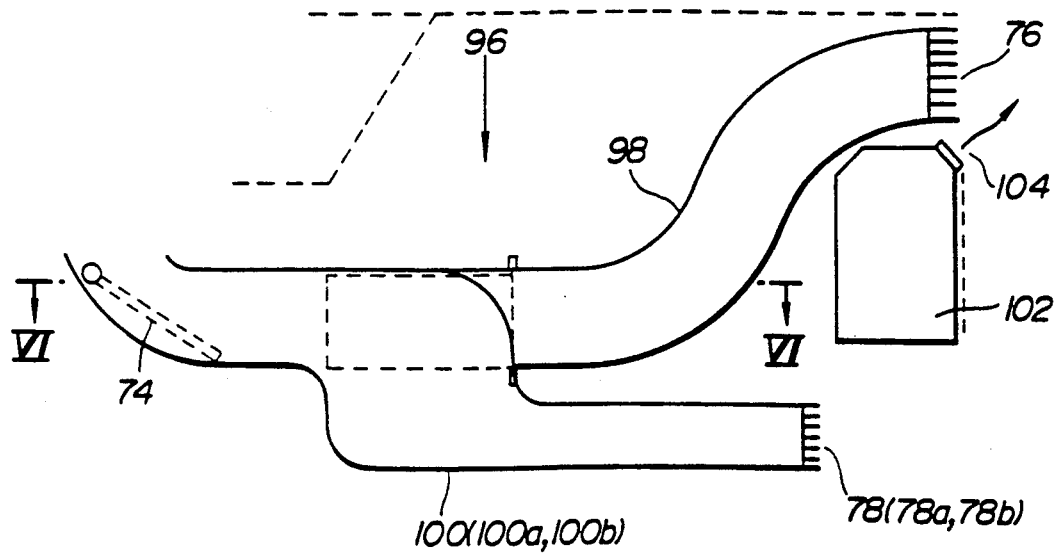
FIG. 5 is an expanded side elevation of a rear air passage of the conditioned air duct assembly in FIG. 2.

As shown in FIG. 5, the rear air passage 50 branches near a center console 96, so that the air introduced into the rear air passage 50 is introduced into respective conditioned air passages 98 and 100 for supplying conditioned air to the rear vehicular occupant at his breast and feet via the rear vent nozzle 76 and the rear foot nozzles 78a and 78b, respectively. The air conditioner system also includes a humidifier 102. The air in the vehicular cabin passes through the humidifier 102 which discharges steam 104 to clean the air and to adjust the humidity in the cabin.

Figure 6:
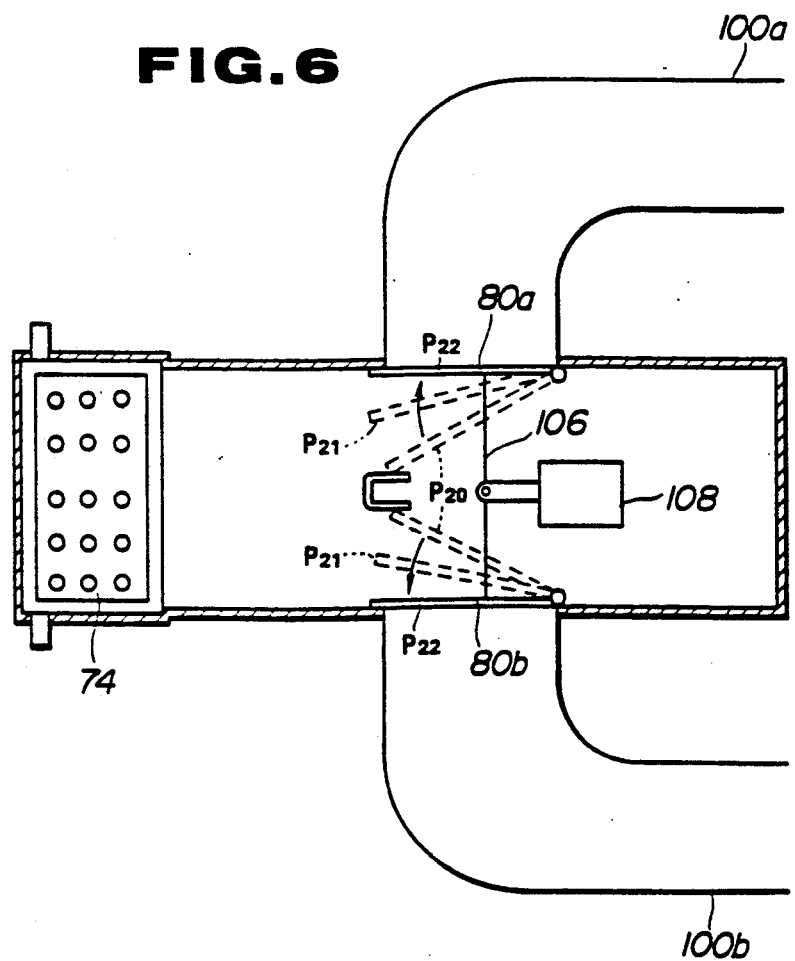
FIG. 6 is a fragmentary sectional view of the rear air passage taken along the line VI—VI.

As shown in FIG. 6, the conditioned air passage 100 consists of bifurcated passages 100a and 100b which is open and closed by the selecting doors 80a and 80b. The selecting doors 80a and 80b are connected to both ends of a control rod 106. The center of the control rod 106 is connected to the tip of the plunger of a solenoid 108. The plunger of the solenoid 108 moves longitudinally so as to cause the selecting door 80a and 80b to open and close in synchronism with each other. As a result, the air conditioner system can selectively operate in a rear VENT mode, a rear BI-LEVEL mode or a rear FOOT mode. In the rear VENT mode, the selecting doors 80a and 80b are positioned at the position P22 to restrict air from being discharged from the rear foot nozzles 78a and 78b, so that air is discharged from only the rear vent nozzle 76. In the rear BI-LEVEL mode, the selecting doors 80a and 80b are positioned at the position P21, so that air is discharged from all of the nozzles 76, 78a and 78b. In the rear FOOT mode, the selecting doors 80a and 80b are positioned at the position P20 to restrict air from being discharged from the rear vent nozzle 76, so that the air is discharged from only the rear foot nozzles 78a and 78b.

The front control unit 38 shown in FIG. 1 includes a microcomputer and produces a control signal on the basis of various input signals. The front control unit 38 is electrically connected to an insolation sensor 110 for monitoring the magnitude of insolation, an ambient temperature sensor 112 for monitoring ambient temperature, an inlet temperature sensor 114 for monitoring inlet temperature, and a water temperature sensor 116 for monitoring temperature of water in a cooling water passage between the engine 34 and the heater core 52. The insolation sensor 110 comprises a phototransistor and produces a sensor signal indicative of the insolation magnitude. The ambient temperature sensor 112 comprises a thermistor and produces a sensor signal indicative of the ambient temperature. The inlet temperature sensor 114 comprises a thermistor installed downstream of the evaporator 44 and produces a sensor signal indicative of the inlet temperature. The water temperature sensor 116 produces a sensor signal indicative of temperature of water in the cooling water passage. These sensor signals are inputted to the front control unit 38. The front control unit 38 is also connected to a set cabin temperature indicator 118 including a manual operation switch assembly for manually setting a desired cabin temperature, and a cabin temperature sensor 120 for monitoring temperature in the vehicular cabin, which are installed on a control panel 122. The set cabin temperature indicator 118 selectively sets the desired cabin temperature and generates a signal indicative of the set cabin temperature. The cabin temperature sensor 120 produces a sensor signal indicative of the temperature as monitored. The signals produced by the set cabin temperature indicator 118 and cabin temperature sensor 120 are inputted to the front control unit 38.

The front control unit 38 outputs control signals to the compressor 28 for driving a magnet relay, and to the blower 24 and the actuator motors M1, M2 and M6.

The rear control unit 92 also receives various input signals from a rear control panel 124 which will be described hereafter and the front control panel 122. The rear control unit 92 also receives the sensor signal indicative of the inlet temperature produced by the inlet sensor 114. On the basis of these signals, the rear control unit 92 outputs a control signal to the actuator motors M3, M4 and M5.

Figure 7:
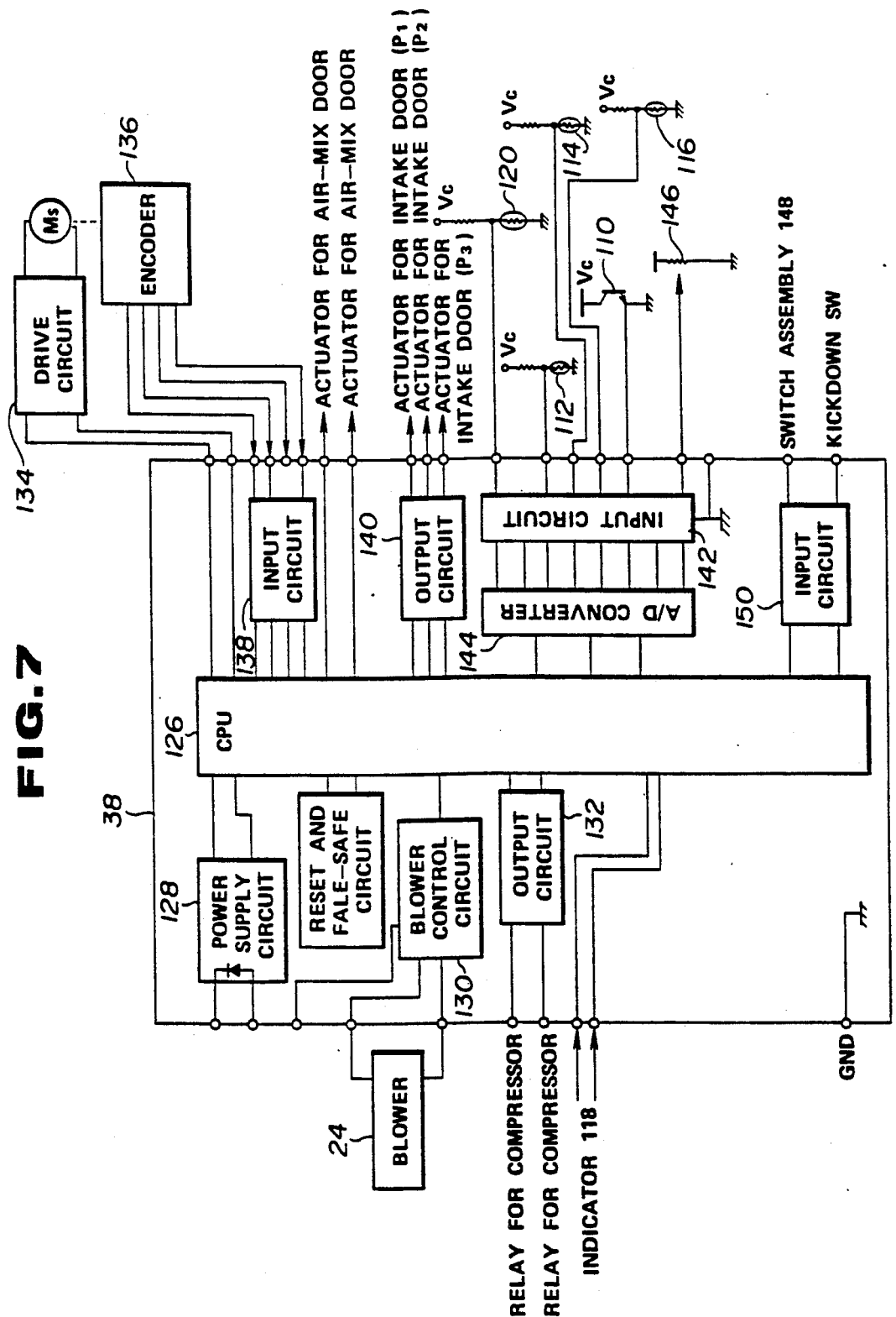
FIG. 7 is a block diagram of a front control unit which controls the air conditioner system in FIG. 1.

FIG. 7 is a block diagram of the front control unit 38. The front control unit 38 includes a microcomputer 126. The microcomputer 126 is electrically connected to a power supply circuit 128 applying constant voltage thereto, and a blower control circuit 130 for adjusting blower speed. The blower control circuit 130 includes an integrating circuit and so forth. The blower control circuit 130 outputs a control signal to the blower 24 and receives a feedback signal from the blower 24. The microcomputer 126 is also connected to an output circuit 132 which outputs a control signal to a relay for controlling the magnetic clutch of the compressor 28. Moreover, the microcomputer 126 outputs a control signal to a drive circuit 134. The drive circuit 134 is electrically connected to the actuator motor M6 to drive the latter. The actuator motor M6 is electrically connected to an encoder 136 which outputs a feedback signal to the microcomputer 126 via an input circuit 138. The microcomputer 126 also outputs a control signal to the motor M1 for driving the intake door 22 via an output circuit 140. The sensor signals are inputted into the microcomputer 126 via an input circuit 142 and an A/D converter 144 which converts an analog signal into a digital signal. That is, sensor signals produced by the cabin temperature sensor 120, the ambient temperature sensor 112, the inlet temperature sensor 114, the water temperature sensor 116 and the insolation sensor 110 are inputted into the input circuit 142. In addition, a sensor signal indicative of opening angle of the front air-mix door which is produced by an opening angle sensor 146 is also inputted into the input circuit 142. In addition, the microcomputer 126 receives a control signal produced by a rear manual operation switch assembly 148 which will be described hereafter, and a kickdown switch signal produced upon rapid acceleration of the vehicle, via an input circuit 150.

Figure 8:
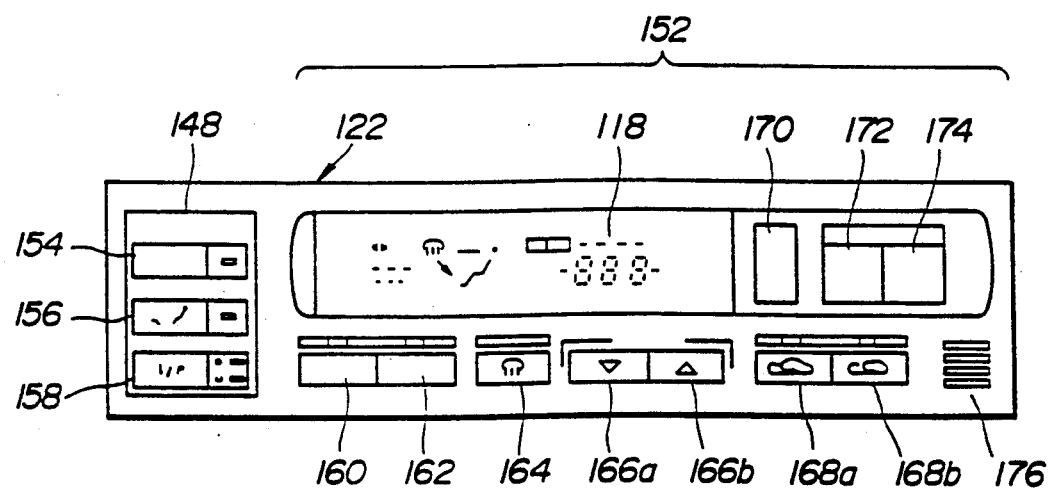
FIG. 8 is a plan view of a front control panel on which manual switches for controlling the air conditioner system of FIG. 1 are installed.

FIG. 8 shows the front control panel 122 in detail. The front control panel 122 has the rear manual operation switch assembly 148 for adjusting the conditioned air discharged to the back seat, and a front manual operation switch assembly 152 for adjusting the conditioned air discharged to the front seat. The rear manual operation switch assembly includes manual switches 154, 156 and 158 for preferentially heating the back seat, for ventilating the back seat, and for driving an air washer and the humidifier for the back seat. The front manual operation switch assembly 152 comprises a blower switch 160, a nozzle selecting switch 162, a defroster switch 164, temperature setting switches 166a and 166b, intake door switches 168a and 168b, an OFF switch 170, an automatic heater switch 172 and an automatic air conditioner switch 174. The speed of the blower 24 is changed in accordance with the number of operations of the blower switch 160. By operating the nozzle selecting switch 162, the air conditioner system can operate in VENT, BI-LEVEL and HEAT modes in turn. In response to turning on of the defroster switch 164, the air conditioner system operates in the defroster mode. When the temperature setting switch 166a is turned on, the set cabin temperature decreases. On the other hand, when the temperature setting switch 166b is turned on, the set cabin temperature increases. The set cabin temperature is exhibited on the set cabin temperature indicator 118. In response to turning on of the intake door switch 168a, the air conditioner system operates in the fresh air mode, so that outside air is introduced into the vehicular cabin. On the other hand, in response to turning on of the intake door switch 168b, the system operates in the recirculation mode, so that the air within the vehicular cabin is recirculated. When the OFF switch 170 is operated, the compressor 28 and the blower 24 are turned off. When the automatic heater switch 172 is operated, only the blower 24 is turned on. When the automatic air conditioner switch 174 is turned on, all of the actuators, such as the compressor 28, the blower 24 and so forth, are automatically driven. An opening 176 for introducing air into the vehicular cabin is formed in the front control panel 122.

Figure 9:
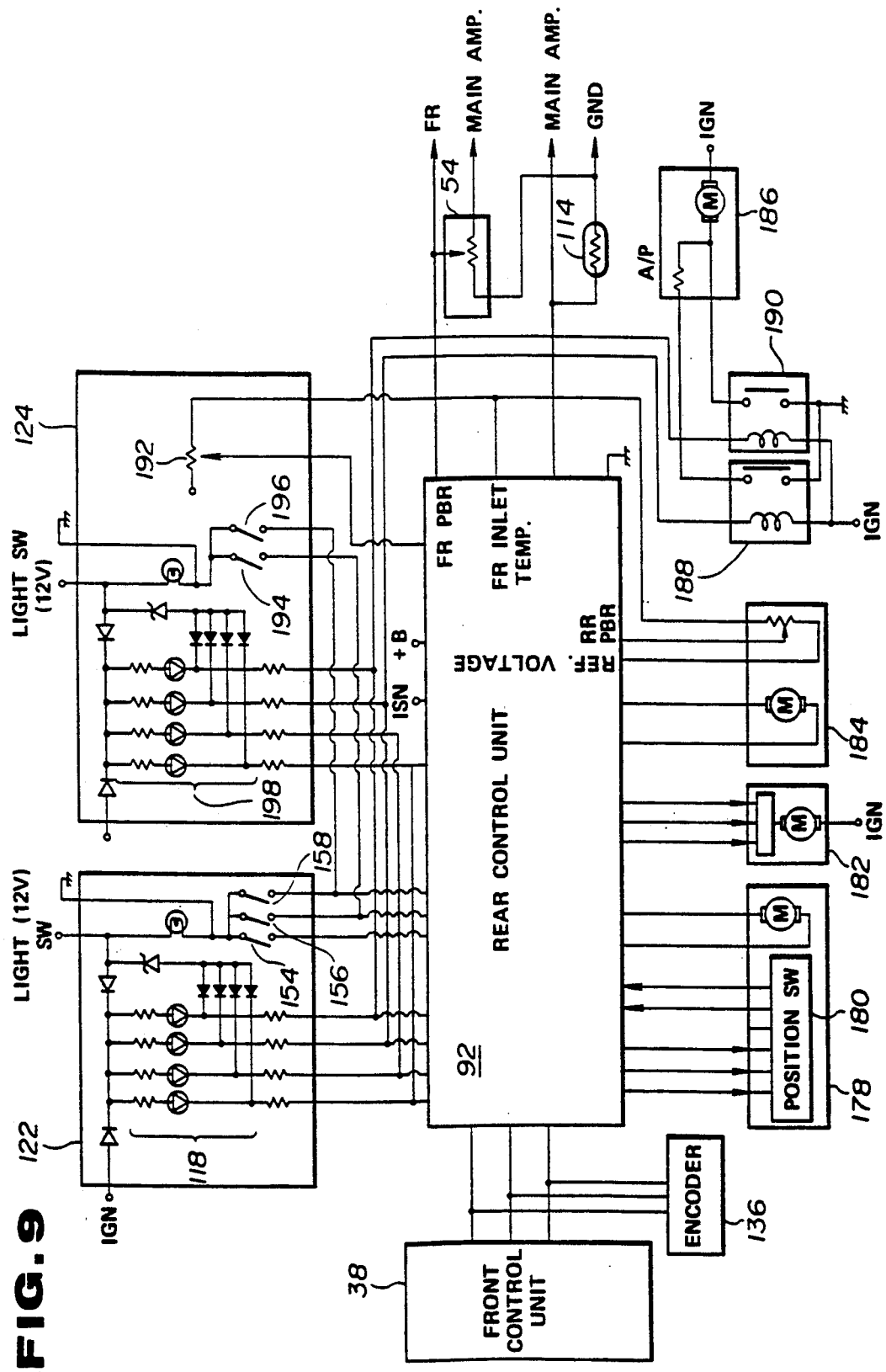
FIG. 9 is a block diagram of a rear control unit which controls the air conditioner system in FIG. 1, and units connected to the rear control unit.

FIG. 9 is a block diagram of the rear control unit 92 and units connected thereto. As shown in FIG. 9, the rear control unit 92 is electrically connected to the front control unit 38. The encoder 136 outputs 3-bit signals to the front and rear control units 38 and 92 in accordance with the operation of mode of the front nozzles. The rear control unit 92 is electrically connected to a separate actuator 178 comprising a position switch 180 and the actuator motor M4. The rear control unit 92 outputs a fully open signal, an intermediate signal or a fully closed signal, by which the air conditioner system operates in the fully open mode, the intermediate mode or the fully closed mode, to the position switch 180. The position switch 180 returns a feedback signal to the rear control unit 92. Then, the rear control unit 92 outputs a control signal to the actuator motor M4. The rear control unit 92 is also connected to a selecting door actuator unit 182 including the actuator motor M5 to output a control signal to the actuator unit 182, so that the selecting door assembly 80 is selectively positioned at the position P20, P21 or P22. In addition, the rear control unit 92 is electrically connected to a rear air-mix door actuator unit 184 including the actuator motor M3 to output a control signal to the actuator unit 184, so that the rear air-mix door 56 is selectively positioned at the position P6 or P7. The rear control unit 92 receives a signal serving as a RRPBR signal indicative of the actual opening angle of the rear air-mix door 56. The rear control unit 92 is further connected to an air washer 186 including an actuator motor M via relays 188 and 190. In response to turning ON of the relay 188, low voltage is applied to the air washer 186. On the other hand, in response to turning ON of the relay 190, high voltage is applied thereto. Moreover, the rear control unit 92 receives a signal indicative of the actual opening angle of the front air-mix door 54, and the sensor signal produced by the inlet temperature sensor 114. The rear control unit 92 is also connected to the front control panel 122 on which the manual switches 154, 156 and 158 and the set cabin temperature indicator 118 comprising a plurality of LED's are installed.

Figure 10:
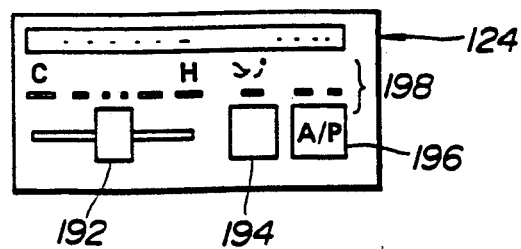
FIG. 10 is a plan view of a rear control panel on which manual switches for controlling the air conditioner system of FIG. 1 for the back seat, are installed.

As shown in FIG. 10, the rear control panel 124 has a manual switch 192 for the fine adjustment of the set temperature in the back seat, a manual switch 194 for ventilating the back seat, and a manual switch 196 for driving the air washer for the back seat. The rear control panel 124 is also provided with an indicator 198 which comprises a plurality of LED's and which represents operation mode of the air washer 186, ventilation mode in the back seat and so forth. As shown in FIG. 9, the manual switches 192, 194 and 196 and the LED's of the indicator 198 are electrically connected to the rear control unit 92.

The operation of the air conditioner system according to the invention is described below.

FIG. 11 shows control process of the front control unit 38 according to the present invention. At step 900, the set cabin temperature $T_{PTC}$ is initialized. In the usual automatic air conditioner mode, the set cabin temperature $T_{PTC}$ is initialized at 25° C. At step 1000, the sensor signals produced by the respective sensors are inputted to the front control unit 38. That is, the sensor signals indicative of the set cabin temperature $T_{PTC}$, the cabin temperature $T_{INC}$, the ambient temperature $T_{AMB}$, the inlet temperature $T_{INT}$, the water temperature $T_W$ and the magnitude of insolation $Q_{SUN}$ respectively are respectively inputted by the manual switches 166a and 166b installed on the front control panel 122, the cabin temperature sensor 120, the ambient temperature sensor 112, the inlet temperature sensor 114, the water temperature sensor 116 and the insolation sensor 110. These sensor signals serve as set cabin temperature data, cabin temperature data, ambient temperature data, inlet temperature data, water temperature data and insolation data, respectively.

At step 1100, the ambient temperature data from the ambient temperature sensor 112 is processed to correspond with actual ambient temperature in consideration of the influence of other heat sources. Next, at step 1200, the insolation data from the insolation sensor 110 is processed. At step 1300, the set cabin temperature data is corrected in accordance with the ambient temperature. At step 1400, the opening angle of the front air-mix door 54 is calculated. At step 1500, actuation of the compressor 28 is controlled. At step 1600, the front nozzles is controlled. At step 1700, the open and close condition of the fresh air inlet 18 and the recirculation air inlet 20 are controlled. At step 1800, the blower 24 is controlled to adjust the air flow rate.

Figure 12:
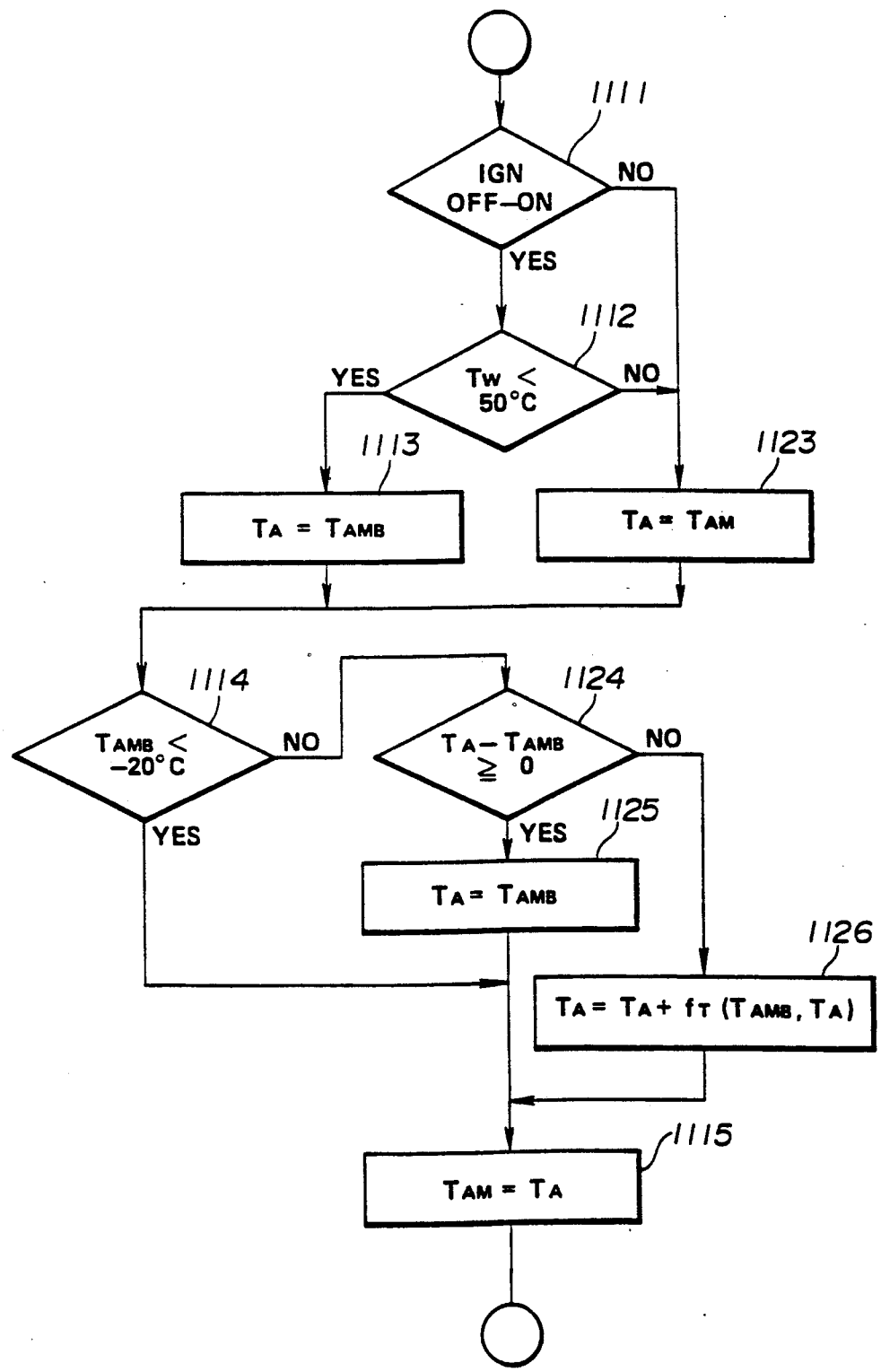
FIG. 12 is a flow chart of a control program for processing data supplied by an ambient air temperature sensor in the process of FIG. 11.

FIG. 12 shows a control program of the processing of the ambient temperature data, according to the invention. In execution of the control program, whether or not initial data has been inputted is monitored at step 1111 when the ignition switch IGN is turned on. When the initial data is inputted, the routine goes to step 1112. At step 1112, whether or not the water temperature $T_W$ is less than 50° C. is estimated. The engine is not warmed imediately after being started if it is cold, the routine then goes to step 1113. At step 1113, the ambient temperature signal $T_{AMB}$ produced by the ambient temperature sensor 112 is set as a temperature parameter $T_A$. Next, whether or not the ambient temperature $T_{AMB}$ is less than −20° C. is estimated at step 1114. If the ambient temperature $T_{AMB}$ is higher than −20° C., the routine then goes to step 1124. At step 1124, whether or not the set temperature parameter $T_A$ is less than the ambient temperature $T_{AMB}$ is estimated. If the ambient temperature increases, i.e. when the set temperature parameter $T_A$ is less than the ambient temperature $T_{AMB}$, the routine goes to step 1126. Immediately after the engine is started, the temperature in the engine compartment in which the ambient temperature sensor 112 is installed increases rapidly due to heat radiated by the engine regardless of the actual ambient temperature. Therefore, increase of the temperature parameter $T_W$ is delayed at step 1126 so that the temperature parameter $T_W$ does not increase in accordance with temporary and rapid increase of the temperature in the engine compartment. For example, at step 1126, the temperature parameter $T_A$ may be increased by 0.2° C. per 1 minute from the initial ambient temperature $T_{AMB}$ Then, at step 1115, the temperature parameter which was increased gradually at step 1126 is stored as the ambient temperature data $T_{AM}$ for use in various operations.

In cases where the engine is re-started after has been stopped temporarily for fueling at a gasoline stand or the like, the routine goes from step 1111 to step 1112. When the engine is re-started, under such conditions the water temperature $T_W$ of the engine is often more than 50° C. In which case, the routine goes from step 1112 to step 1123. At step 1123, the ambient temperature data $T_{AM}$ stored at step 1115 is set as the temperature parameter $T_A$. Thereafter, the routine goes to step 1114, and the same process is performed. After the engine is stopped, the temperature in the engine compartment is much higher than the actual ambient temperature due to the heat of the engine, so the ambient temperature sensor 112 can not accurately monitor the actual ambient temperature. Therefore, when the water temperature $T_W$ is higher than a maximum value, the temperature in the engine compartment is disregarded, the stored value is used as the temperature parameter so as to prevent the air conditioner system from being improperly controlled.

In cases where the signal line or connector is temporarily broken between the ambient temperature sensor 112 and the front control unit 38 due to imperfect contact of the signal line or connector, at the impedance input of the computer 126 becomes high. As a result, the computer 126 perceives that the ambient temperature $T_{AMB}$ is −30° C. which is the minimum value. Since the ambient temperature $T_{AMB}$ is perceived as being less than −20° C., the routine goes from step 1114 to step 1115, so that the delay operation at step 1126 is cancelled. Therefore, it is possible to prevent the computer 126 from perceiving the ambient temperature to be very low for an extended time.

Figure 13:
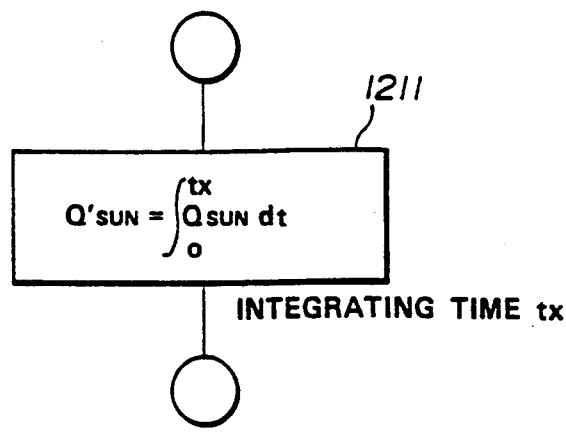
FIG. 13 is a flow chart of a control program for processing data supplied by an insolation sensor in the process of FIG. 11.

FIG. 13 shows a control program of the processing of the insolation magnitude value, according to the invention.

The insolation sensor 110 comprises a phototransistor. Current passing through the phototransistor is directly proportional to the magnitude of insolation. Therefore, current passing through the phototransistor is integrated for a predetermined time $t_x$ to be $Q_{SUN}'$ which is set as the insolation data.

Figure 14:
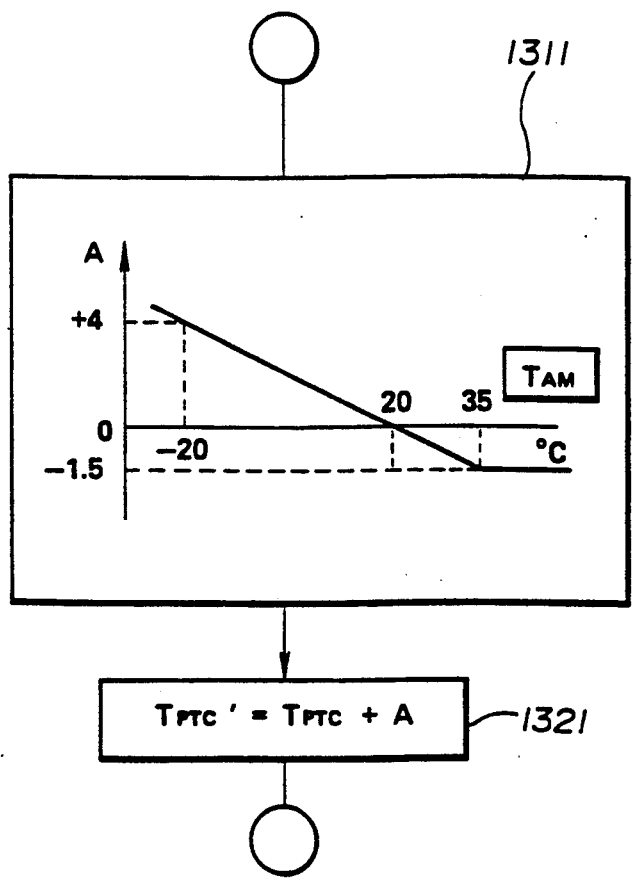
FIG. 14 is a flow chart of a control program for correcting the set cabin temperature in the process of FIG. 11.

FIG. 14 shows a control program of correction of the set cabin temperature. At step 1311, the correction value A for the set cabin temperature is set. The correction value A is zero when the ambient temperature data $T_{AM}$ is 20° C. When the ambient temperature data $T_{AM}$ is higher than 20° C., for example, 30° C., the correction value A is −1.5° C. On the other hand, when it is lower than 20° C., for example, −20° C., the correction value A is +4° C. At step 1321, the set cabin temperature $T_{PTC}$ is corrected by adding the correction value A. The corrected set cabin temperature $T_{PTC}'$ is used in actual operation.

Figure 15:
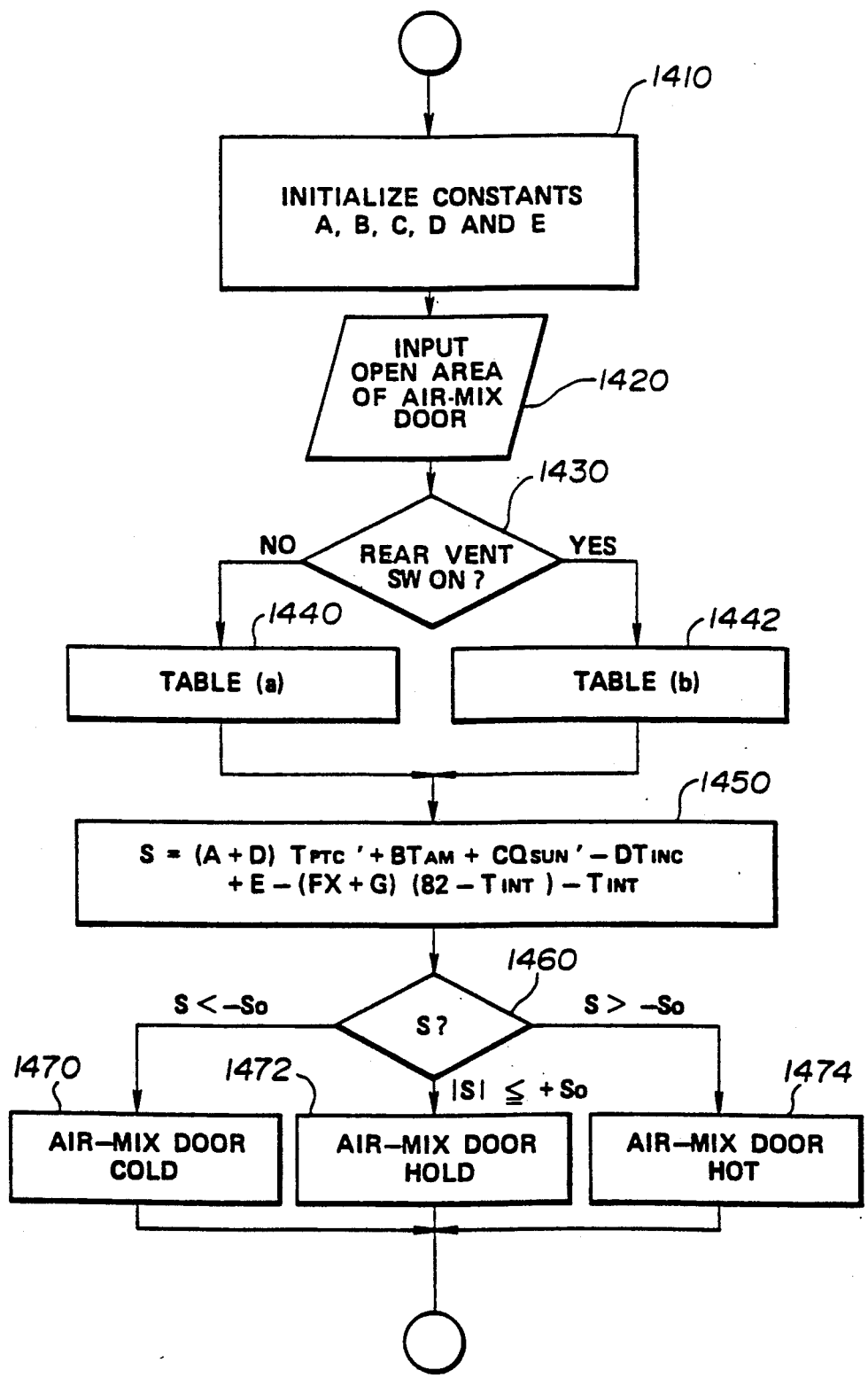
FIG. 15 a flow chart of a control program for calculating opening angle of the air-mix door in the process of FIG. 11.

FIG. 15 shows a control program of the calculation of opening angle of the air-mix door in FIG. 11, according to the invention. At step 1410, constants A, B, C, D and E are initialized. At step 1420, opening angle X of the air-mix door determined on the basis of the actual opening angle signal produced by the front air-mix door opening angle sensor 146 is inputted. Whether or not the rear vent switch 156 or 194 is turned on is judged at step 1430. When the rear vent switch 156 and 194 are OFF, constants F and G corresponding to the inputted opening angle X of the air mix door are selected from Table (a) at step 1440. The selected constants F and G are used in calculation of the present heating value.

TABLE

| (a) REAR VENT SW ON | | | (b) REAR VENT SW OFF | | |
| --- | --- | --- | --- | --- | --- |
| X | F | G | X | F | G |
| 0-$X_1$ | $F_1$ | $G_1$ | 0-$X_1$ | $F_6$ | $G_6$ |
| $X_1$-$X_2$ | $F_2$ | $G_2$ | $X_1$-$X_2$ | $F_7$ | $G_7$ |
| $X_2$- | $F_3$ | $G_3$ | $X_2$- | $F_8$ | $G_8$ |

On the other hand, when the rear vent switch 156 or 194 is ON, constants F and G corresponding to the inputted opening angle X of the air mix door are selected from Table (b) at step 1442. Then, deviation S between a desired discharge air temperature and the actual discharge air temperature is calculated at step 1450. The constants F and G selected at step 1440 or 1442 are used in the calculating of the deviation S. The deviation S calculated at step 1450 is estimated at step 1460. When the deviation S is less than a predetermined value $-S_0$, the routine goes to step 1470 in which the front air-mix door 54 is positioned at the cold position, i.e. at the position P4. On the other hand, when the deviation S is greater than the value $+S_0$, the routine goes to step 1474 in which the front air-mix door is positioned at the hot position, i.e. the position P5. When the deviation S is from $-S_0$ to $+S_0$, the routine goes to step 1472 in which the front air-mix door is not moved. The constants $F_1$, $F_2$ and $F_3$ in Table (a) are set to be less than the corresponding constants $F_6$, $F_7$ and $F_8$ in Table (b). The constants $G_1$, $G_2$ and $G_3$ in Table (a) are also set to be less than the corresponding constants $G_6$, $G_7$ and $G_8$ in Table (b).

Figure 16:
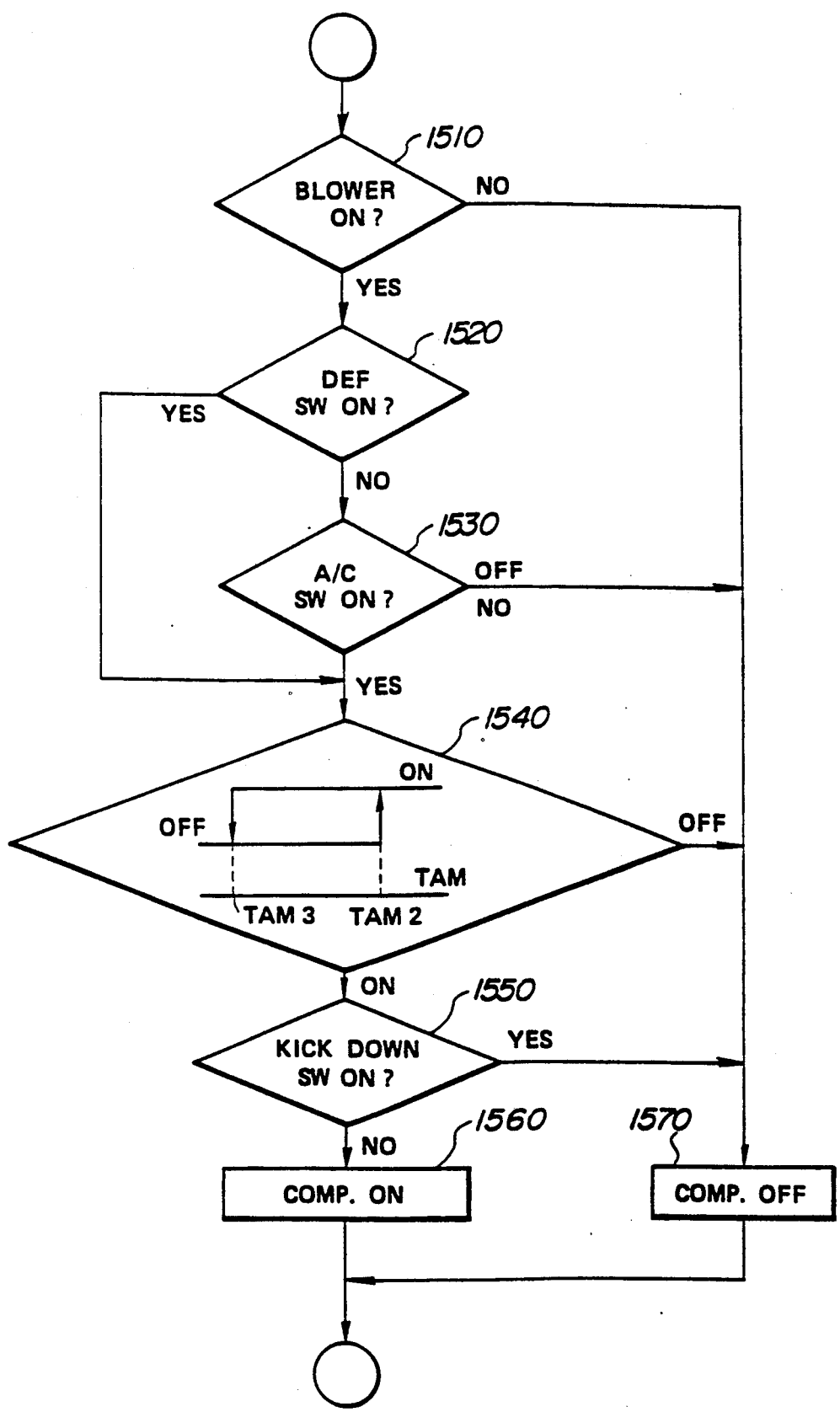
FIG. 16 is a flow chart of control a program for controlling a compressor of the air conditioner system of FIG. 1 in the process of FIG. 11.

FIG. 16 is a flow chart of a program for controlling the compressor 28 at step 1500 in FIG. 11. At step 15, whether or not the blower 24 is ON is estimated. When the blower 24 is OFF, the routine goes to step 1570 in which the compressor 28 is turned off. On the other hand, when, at step 1510, it is estimated that the blower 24 is ON, the routine goes to step 1520 in which whether or not the defroster switch 164 is ON is determined. When the defroster switch 164 is ON, the routine goes from step 1520 to step 1540. On the other hand, when the defroster switch 164 is OFF, the routine goes to step 1530 in which whether or not the air conditioner switch 174 is ON is determined. When the air conditioner switch 174 is OFF, the routine goes to step 1570 in which the compressor 28 is turned off. On the other hand, when the air conditioner switch 174 is ON, the routine goes from step 1530 to step 1540. At step 1540, it is determined whether or not the process for protecting the compressor 28 at very low ambient temperature is required. That is, while the ambient temperature data $T_{AM}$ is decreasing, the routine goes from step 1540 to step 1550 until the ambient temperature data $T_{AM}$ reaches a predetermined value $T_{AM3}$. When the ambient temperature data $T_{AM}$ becomes less than the value $T_{AM3}$, the routine goes from step 1540 to step 1570 in which the compressor 28 is turned off. On the other hand, while the ambient temperature data $T_{AM}$ is increasing, the routine goes from step 1540 to step 1570 until the ambient temperature data $T_{AM}$ reaches a predetermined value $T_{AM2}$. When the ambient temperature data $T_{AM}$ becomes greater than the value $T_{AM2}$, the routine goes from step 1540 to 1550. At step 1550, whether or not the kickdown switch is turned on is determined. If the kickdown switch is turned on, the routine goes to step 1570 in which the compressor 28 is turned off. On the other hand, if the kickdown switch is not turned on, the routine goes from step 1550 to step 1560 in which the compressor 28 is turned on.

Figure 17:
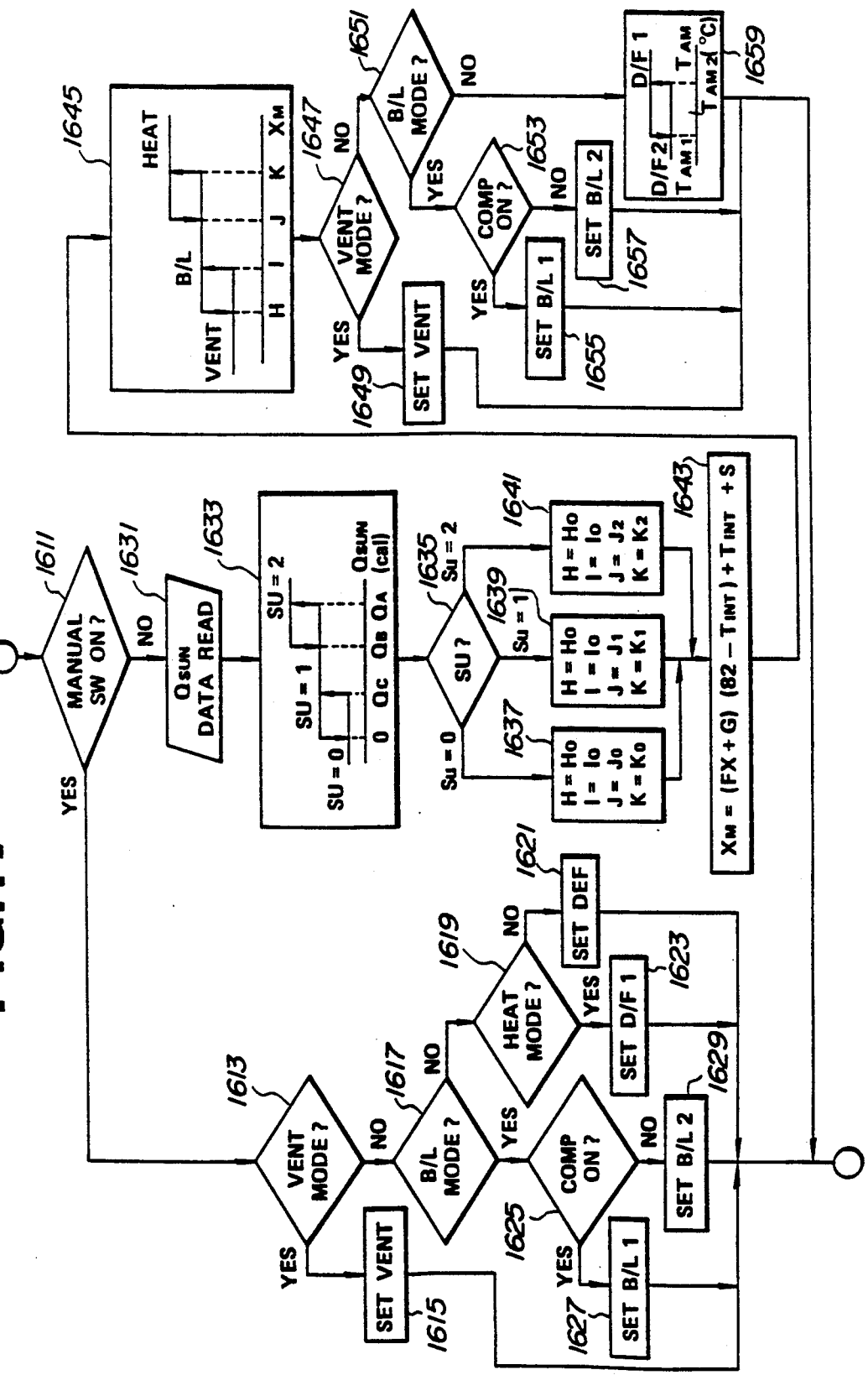
FIG. 17 is a flow chart of the first preferred embodiment of a control program for controlling discharge nozzles of the air conditioner system of FIG. 1 in the process of FIG. 11.

FIG. 17 is a flow chart of the first preferred embodiment of a control program for controlling the discharge nozzles at step 1600 in FIG. 11. At step 1611, whether or not the discharge nozzle selecting switch 162 is ON is judged. When the discharge nozzle selecting switch 162 is ON, the routine goes from step 1611 to step 1613 in which whether or not the air conditioner system is operating in VENT mode is determined. When the system is operating in VENT mode, the routine goes to step 1615 in which a signal is outputted to the actuator motor M6 so as to open the front vent door 66. On the other hand, when the system is not operating in VENT mode, the routine goes from step 1613 to step 1617 in which whether or not the system is operating in BI-LEVEL mode is determined. When the system is operating in BI-LEVEL mode, the routine goes from step 1617 to step 1625 in which it is determined whether or not the compressor 28 is ON. When the compressor 28 is ON, the routine goes from step 1625 to step 1627 in which the operation mode of the system is set to be BI-LEVEL mode 1. In BI-LEVEL mode 1, the front vent door 66 and the front foot door 68 are open. At step 1625, when it is determined that the compressor 28 is OFF, the routine goes from step 1625 to step 1629 in which the operation mode thereof is set to be BI-LEVEL mode 2. In the BI-LEVEL mode 2, the front vent door 66, the front foot door 68 and the front defroster door 64 are open.

When the operation mode of the system is neither VENT mode nor BI-LEVEL mode, the routine goes from step 1617 to step 1619 in which whether or not the operation mode is HEAT mode is determined. When the system operates in HEAT mode, the routine goes from step 1619 to step 1623 in which the operation mode is set to be DEF-FOOT mode 1. At the DEF-FOOT mode 1, the front defroster door 64 is positioned at the position P9, and the front foot door 68 is positioned at the position P14. Therefore, at the DEF-FOOT mode 1, the proportion of the air flow discharged from the front defroster door 64 to that from the front foot door 68 is set, for example, 1 to 9.

When the operation mode is neither the VENT mode, BI-LEVEL mode or HEAT mode, the routine goes from step 1619 to step 1621 in which the operation mode is set to be DEF mode. In the DEF mode, the front defroster door 64 is positioned at fully open the position 10.

At step 1611, when it is determined that the discharge nozzle selecting switch 162 is OFF, i.e. that the air conditioner system is operating in the automatic air conditioner mode, the routine goes from step 1611 to step 1631 in which the insolation data $Q_{SUN}$ is read. Then, at step 1633, a weighted mean is calculated on the basis of the insolation data $Q_{SUN}$ in order to select the discharge nozzle mode. At step 1633, until the insolation data $Q_{SUN}$ decreases to $Q_B$ calories, the weighted mean SU is set to be 2. If the insolation data $Q_{SUN}$ further decreases, the weighted mean SU is set to be 1 until the insolation data $Q_{SUN}$ reaches zero calories. On the other hand, when the isolation data $Q_{SUN}$ increases, the weighted means SU is set to be zero while the insolation data $Q_{SUN}$ is between zero and $Q_C$ calories. Thereafter, while the insolation data $Q_{SUN}$ further increases to $Q_A$ calorie, the weighted means SU is set to be 1. When the insolation data $Q_{SUN}$ further increases to be greater than $Q_A$ calorie, the weighted mean is set to be 2. Thereafter, the routine goes to step 1635 in which the weighted mean set at the last step 1633 is estimated. When the weighted mean SU is zero, the routine goes to step 1643 via step 1637. When the weighted mean SU is 1, the routine goes to step 1643 via step 1639. When the weighted mean SU is 2, the routine goes to step 1642 via step 1641. At these steps 1637, 1639 and 1641, constants H, I, J and K are set. Only the constants J and K are changed in accordance with the value of the weighted mean SU. The constant $J_1$ is greater than $J_0$, and the constant $J_2$ is greater than $J_1$. The constant $K_1$ is greater than $K_0$, and the constant $K_2$ is greater than $K_1$. At step 1643, a required discharge air temperature $X_M$ is calculated. Then, the routine goes to step 1645 in which the discharge nozzle mode is set on the basis of the required discharge air temperature $X_M$ calculated at step 1643. At step 1645, until the required discharge air temperature $X_M$ decreases to the value J, the operation mode is set to be HEAT mode. Thereafter, while the required discharge air temperature $X_M$ further decreases to the value H, the operation mode is set to be BI-LEVEL mode. On the other hand, until the required discharge temperature $X_M$ increases to the value I, the operation mode is set to be VENT mode. Thereafter, while the required discharge air temperature $X_M$ further increases to the value K, the operation mode is set to be BI-LEVEL mode. If the required discharge air temperature $X_M$ further increases to greater than the value K, the operation mode is set to be HEAT mode. Therefore, by changing the values J and K in accordance with the weighted mean SU, the mode switching point between the HEAT mode and the BI-LEVEL mode can be changed in accordance with the magnitude of insolation. Thereafter, the routine goes from step 1645 to step 1647 in which whether or not the set discharge nozzle mode is VENT mode is determined. When set discharge nozzle mode is VENT mode, the routine goes to step 1649 in which the front vent door 66 is opened so that the air is discharged from the front vent nozzle 60. When the operation mode is not VENT mode, the routine goes from step 1647 to step 1651 in which whether or not the operation mode is BI-LEVEL mode is determined. When it is BI-LEVEL mode, the routine goes to step 1653 in which whether or not the compressor 28 is ON is determined. When the compressor 28 is ON, the routine goes from step 1653 to step 1655 in which the operation mode is set to be BI-LEVEL 1. In the BI-LEVEL mode 1, the front vent door 66 and the front foot door 68 are open. On the other hand, when the compressor 28 is OFF, the routine goes from step 1653 to step 1657 in which the operation mode is set to be BI-LEVEL mode 2. In the BI-LEVEL mode 2, the front vent door 66, the front foot door 68 and the front defroster door 64 are open.

When the operation mode is neither VENT mode nor BI-LEVEL mode, the routine goes from step 1651 to step 1659 in which a specific HEAT mode, for example DEF-FOOT mode 1 or DEF-FOOT mode 2, is set among a plurality of HEAT modes in accordance with the ambient temperature data $T_{AM}$. While the ambient temperature data $T_{AM}$ decreases towards the value $T_1$, for example, $-3°$ C., the operation mode is set to be DEF-FOOT mode 1. On the other hand, while the ambient temperature data $T_{AM}$ increases toward the value $T_0$, for example, $0°$ C., the operation mode is set to be DEF-FOOT mode 2. When the ambient temperature data $T_{AM}$ further increases to be greater than the value $T_0$, the operation mode is set to be DEF-FOOT mode 1. At the DEF-FOOT mode 1, the front defroster door 64 is positioned at the position P9, and the front foot door 68 is positioned at the position P14. On the other hand, at the DEF-FOOT mode 2, the front defroster door 64 is positioned at the position P10, and the front foot door 68 is positioned at the position P14. Therefore, the flow rate of the air discharged from the front defroster nozzle 58 at the DEF-FOOT mode 1 is less than that at the DEF-FOOT mode 2.

Figure 18:
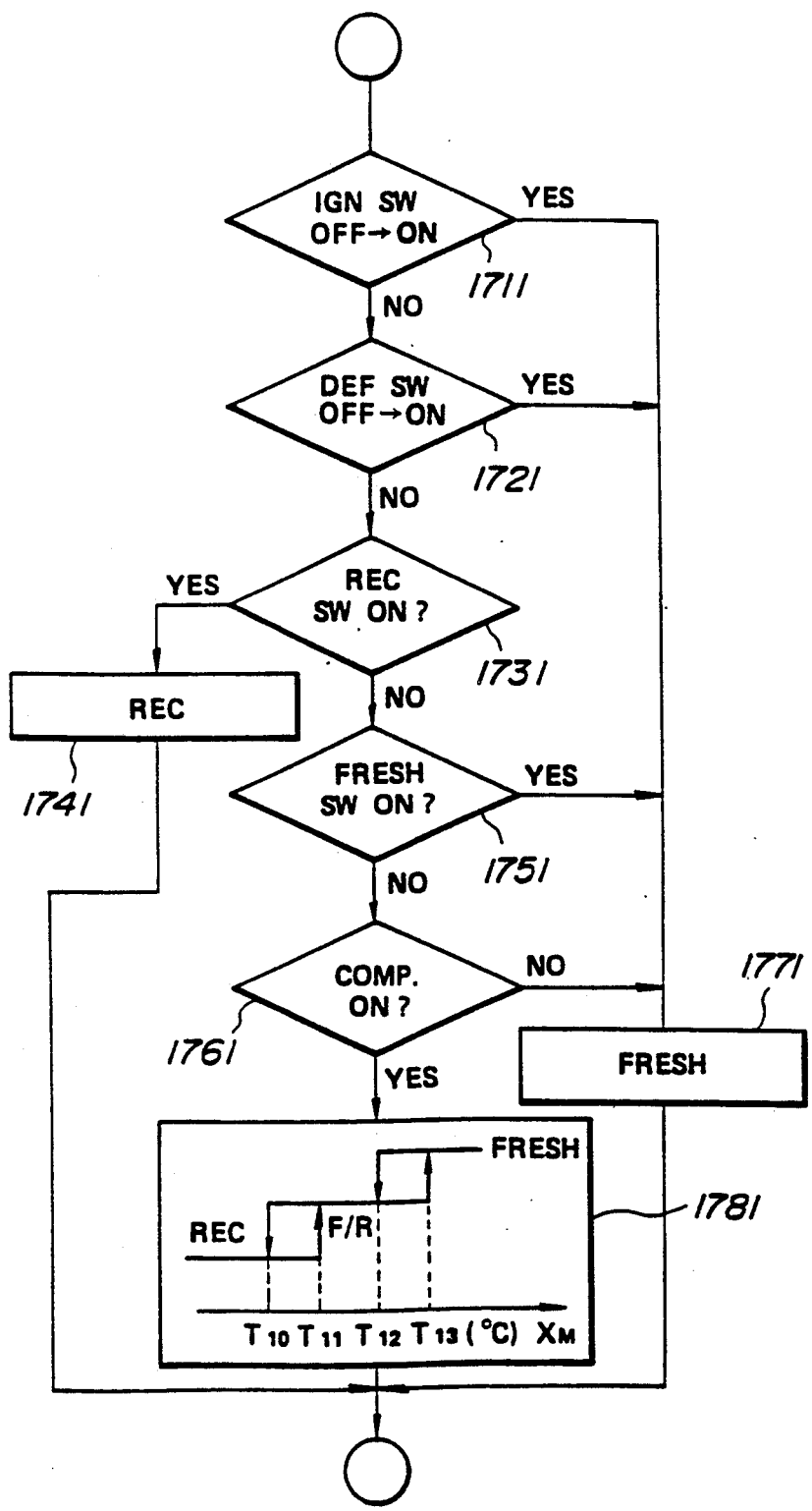
FIG. 18 is a flow chart of a control program for controlling inlets of the air conditioner system of FIG. 1 in the process of FIG. 11.

FIG. 18 shows a flow chart of a program for controlling the inlets at step 1700 in FIG. 11. At step 1711, whether or not the ignition switch is ON is judged. When the ignition switch is turned on, the routine goes to step 1771 in which the intake door 22 is positioned at the position P3 in FIG. 1 so that the operation mode is set to be the fresh air mode. Next routine goes from step 1711 to step 1721 in which whether or not the defroster switch 164 is ON is judged. If the defroster switch 164 is ON, the routine goes from step 1721 to step 1771 in which the operation mode is set to be the fresh air mode. On the other hand, if the defroster switch 164 is not ON, the routine goes from step 1721 to step 1731 in which whether or not the recirculation switch, i.e. the intake door switch 168a is ON is judged. If the intake door switch 168a is ON, the routine goes to step 1741 in which the intake door 22 is positioned at the position P1 so that air is drawn into the recirculation air nozzle 20, i.e. the operation mode is set to be the recirculation mode. On the other hand, when the intake door switch 168a is OFF, the routine goes from step 1731 to step 1751 in which whether or not the fresh air mode switch, i.e. the intake door switch 168b is ON is judged. If the intake door switch 168b is ON, the routine goes to step 1771 in which the operation mode is set to be the fresh air mode. On the other hand, when the intake door switch 168b is OFF, the routine goes from step 1751 to step 1761 in which whether or not the compressor 28 is ON is determined. When the compressor 28 is OFF, the routine goes to step 1771 in which the operation mode is set to be the fresh air mode. On the other hand, when the compressor 28 is ON, the routine goes from step 1761 to step 1781 in which the inlet mode is controlled in accordance with the required discharge air temperature $X_M$. At step 1781, until the required discharge air temperature $X_M$ decreases gradually to be $T_{12}°$ C., the inlet mode is set to be the fresh air mode. When the required discharge air temperature $X_M$ further decreases between $T_{12}°$ C., and $T_{10}°$ C., the inlet mode is set to be F/R mode in which both fresh air and recirculation air are introduced into the conditioning air duct assembly 10. That is, in the F/R mode, the intake door 22 is positioned at the position P2, so that the air in the vehicular cabin is introduced into the duct assembly 10 from the recirculation air inlet 20, and the fresh air is introduced into the duct assembly 10 from the fresh air inlet 18. When the required discharge air temperature $X_M$ is less than $T_{10}°$ C., the inlet mode is set to be the recirculation mode. On the other hand, when the required discharge air temperature $X_M$ increases, the inlets remains in the recirculation mode until the temperature $X_M$ reaches $T_{11}°$ C., When the required discharge air temperature $X_M$ further increases, the inlet mode is set to be F/R mode until the temperature reaches $T_{13}°$ C., When the required discharge air temperature $X_M$ further increases to be greater than $T_{13}°$ C., the inlet mode is set to be the fresh air mode. Furthermore, the temperature $T_{11}$ is greater than $T_{10}$, the temperature $T_{12}$ is greater than $T_{11}$, and the temperature $T_{13}$ is greater than $T_{12}$.

In FIGS. 17 and 18, although the setting of the inlets and the selecting of the discharge nozzles is controlled on the basis of the required discharge air temperature $X_M$, it can be controlled on the basis of the actual discharge air temperature. That is, the following formula is used at step 1643 in FIG. 17, and the setting of the discharge air nozzles and the inlets can be performed on the basis of $X_M'$ at step 1645 in FIG. 17 and at step 1781 in FIG. 18, respectively.

$$X_m'=(FX+G)(82-T_{INT})+T_{INT}$$

Figure 19:
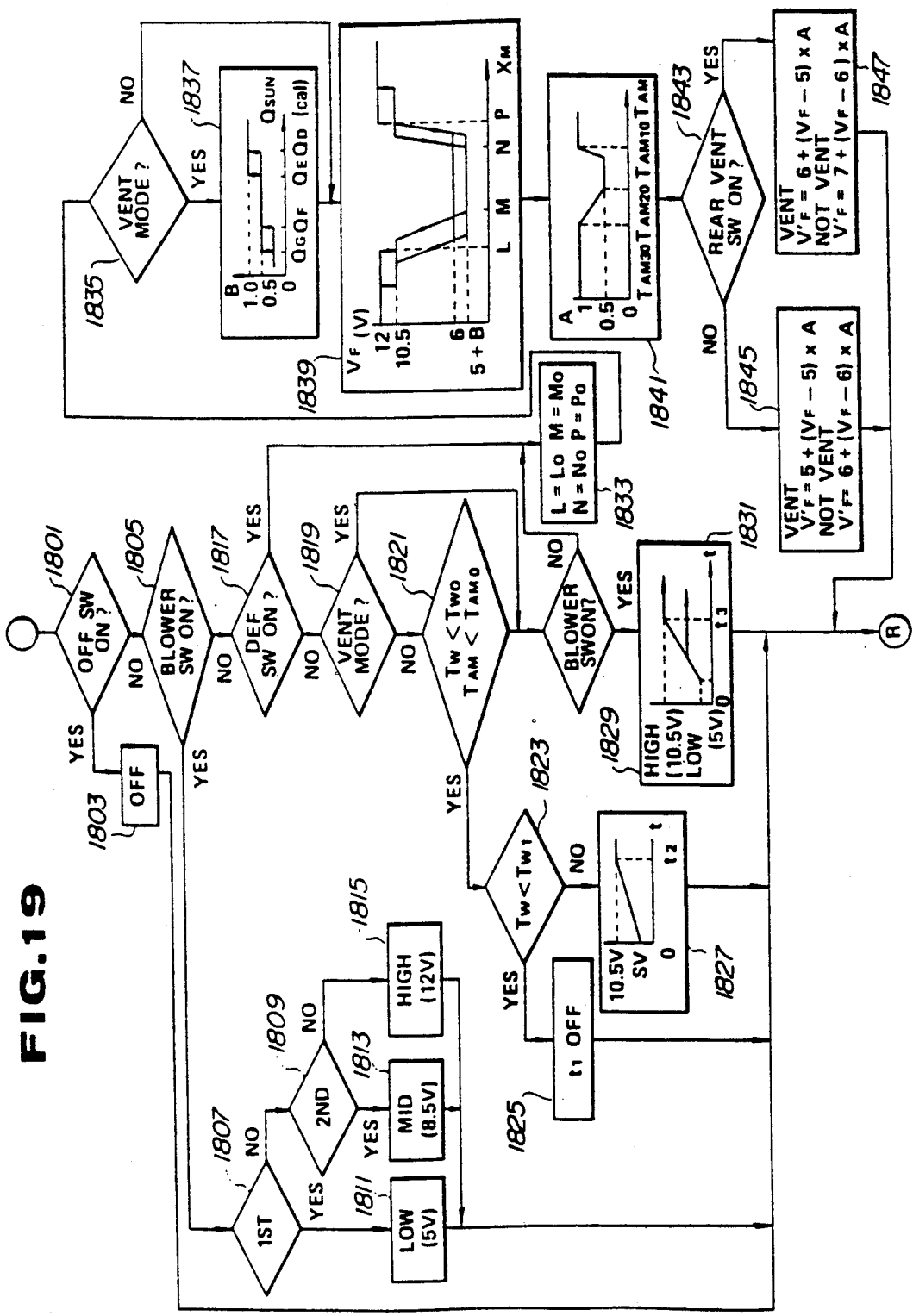
FIG. 19 is a flow chart of a control program for controlling the air flow rate of the air conditioner system of FIG. 1 in the process of FIG. 11.

FIG. 19 is a flow chart of a program for controlling the air flow rate at step 1800 in FIG. 11. At step 1801, whether or not the OFF switch 170 is operated is determined. If the OFF switch 170 has been operated, the routine goes to step 1803 in which the blower 24 is turned off. On the other hand, if the OFF switch 170 has not been operated, the routine goes from step 1801 to step 1805 in which it is determined whether or not the blower switch 160 is ON. When the blower switch 160 is ON, the routine goes from step 1805 to step 1807 in which it is determined whether or not the blower 24 is to operate at a low speed. If the blower 24 is to operate at the lowest speed, i.e. a first speed, the routine goes from step 1807 to step 1811 in which a 5-volt current is applied to the blower 24. At step 1807, if it is estimated that the blower 24 should not operate at the lowest speed, the routine goes to step 1809 in which whether or not the blower 24 should operate at a medium speed, i.e. at a second speed, is determined. When the blower 24 is to operate at the second speed, the routine goes from step 1809 to step 1813 in which 8-volt current is applied to the blower 24. When the blower 24 is to operate at neither the first speed nor the second speed, the routine goes from step 1809 to step 1815 in which 12-volt current is applied to the blower 24 so that the blower 24 operates at a high speed.

At step 1805, when it is estimated that the blower switch 160 is OFF, the routine goes to step 1817 in which whether or not the defroster switch 164 is ON is determined. When the defroster switch 164 is OFF, the routine goes from step 1817 to step 1819 in which it is determined whether or not the discharge nozzle is in the VENT mode. When the discharge nozzle mode is not the VENT mode, the routine goes from step 1819 to step 1821 in which whether or not the water temperature $T_W$ of the engine 34 is less than the value $T_{W0}$, for example, 35° C., and whether or not the ambient air temperature data $T_{AM}$ is less than the value $T_{AM0}$, for example, 15° C. are determined. When the water temperature $T_W$ of the engine 34 is less than the value $T_{W0}$, and the ambient air temperature data $T_{AM}$ is less than the value $T_{AM0}$, the routine goes from step 1821 to step 1823 in which whether or not the water temperature $T_W$ of the engine 34 is less than the value $T_{W1}$, for example, 32° C. which is less than the value $T_{W0}$ is determined again. When the water temperature $T_W$ of the engine 34 is less than the value $T_{W1}$, the routine goes from step 1823 to step 1825 in which the blower 24 is turned off for a predetermined time $t_1$. On the other hand, at step 1823, when it is estimated that the water temperature $T_W$ is not less than the value $T_{W1}$, the routine goes from step 1823 to step 1827. At step 1827, electrical current is applied to the blower 24 in such a manner that the lowest voltage, i.e. 5-volts is applied to the blower 24 and thereafter increased gradually to the maximum voltage, i.e. 10.5-volts after a predetermined time $t_2$. At step 1821, when it is estimated that either the water temperature $T_W$ is greater than the value $T_{W0}$ or the ambient air temperature data $T_{AM}$ is greater than the value $T_{AM0}$, the routine goes from step 1821 to step 1829. At step 1829, whether or not the blower switch 160 is ON is determined. When the blower switch is ON, the routine goes from step 1829 to step 1831 which restricts voltage from being suddenly applied to the blower 24 in order to prevent the brush of the blower 23 from wearing out. That is, at step 1831, first 5-volt current is applied to the blower 24 and thereafter the voltage is increased gently to 10-volts during a predetermined time $t_3$.

When the automatic air conditioner mode is selected, and the defroster switch 164 is ON, the routine goes from step 1817 to step 1833. In addition, at step 1829, when it is estimated that the blower switch 160 is ON, the routine goes from step 1829 to step 1833. At step 1833, the constants L, M, N and P are initialized to be $L_0$, $M_0$, $N_0$ and $P_0$. Thereafter, the routine goes from step 1833 to step 1835 in which whether or not the operation mode is the VENT mode is determined. When the operation mode is not the VENT mode, the routine goes to step 1839. On the other hand, when the operation mode is VENT mode, the routine goes to step 1839 via step 1837 in which the correction voltage B of the impressed reference voltage $V_F$ which is applied to the blower 24 is set in accordance with the magnitude of insolation $Q_{SUN}$. At step 1837, until the magnitude of insolation $Q_{SUN}$ decreases to $Q_E$ calories, the correction voltage B is set at 1.0 volt. Thereafter, until the magnitude of insolation $Q_{SUN}$ further decreases to $Q_G$ calories, the correction voltage B is set to be 0.5 volt. When the magnitude of insolation $Q_{SUN}$ becomes less than $Q_G$ calorie, the correction voltage B is set at zero. On the other hand, until the magnitude of insolation $Q_{SUN}$ increases to $Q_F$ calories, the correction voltage B is set at zero. Until the magnitude of insolation $Q_{SUN}$ further increases to $Q_D$ calorie, the correction voltage B is set at 0.5 volt. When the magnitude of insolation $Q_{SUN}$ becomes greater than $Q_D$ calories, the correction voltage B is set at 1.0 volt. At step 1839, the impressed reference voltage $V_F$ which is applied to the blower 24 is determined in accordance with the required discharge air temperature $X_M$. Since rapid cooling or heating must be performed when the required discharge air temperature $X_M$ is greater or less than a predetermined value, the impressed reference voltage $V_F$ applied to the blower 24 is set to be relatively high. On the other hand, when the required discharge air temperature $X_M$ is usual value, for example, between M and N, the impressed reference voltage $V_F$ applied to the blower 24 is set to be the minimum voltage. That is, when the discharge nozzle is in the VENT mode, the impressed reference voltage $V_F$ is set at 5-volts + the correction voltage B. On the other hand, when the discharge nozzle mode is not VENT mode, the minimum impressed reference voltage $V_F$ which, is applied to the blower 24 is set at 6-volts. Thereafter, the routine goes to step 1841 in which a correction coefficient A is set in accordance with the ambient temperature data $T_{AM}$. That is, When the ambient temperature data $T_{AM}$ is greater than a predetermined value $T_{AM}10$ or less than $T_{AM}30$, the correction coefficient A is set at 1. When the ambient temperature data $T_{AM}$ is between $T_{AM}30$ and a predetermined value $T_{AM}20$, the correction coefficient A is determined in accordance with a given characteristic curve in step 1841. When the ambient temperature data $T_{AM}$ is between $T_{AM}20$ and $T_{AM}10$, the correction coefficient A is set at 0.5. The routine then goes to step 1843 in which it is determined whether or not either of the rear vent switches 156 or 194 is ON. If either of the rear vent switches 156 or 194 is ON, the routine goes to step 1847. On the other hand, if both of the rear vent switches 156 and 194 are OFF, the routine goes to step 1845. At steps 1845 and 1847, the impressed voltage $V_F'$ applied to the blower 24 is determined by a predetermined operational expression in accordance with whether or not the front nozzle is in the VENT mode. When the impressed voltage $V_F'$ applied to the blower 24 is calculated, the correction coefficient A determined at step 1841 is used. If the ambient condition are the same, the impressed voltage $V_F'$ applied to the blower 24 when either the rear vent switch 156 or 232 is ON is greater than that when both of the switches 156 and 232 are OFF.

When the operation described in the flow chart in FIG. 19 is executed, the routine returns to step 1000 in FIG. 11.

Figure 20:
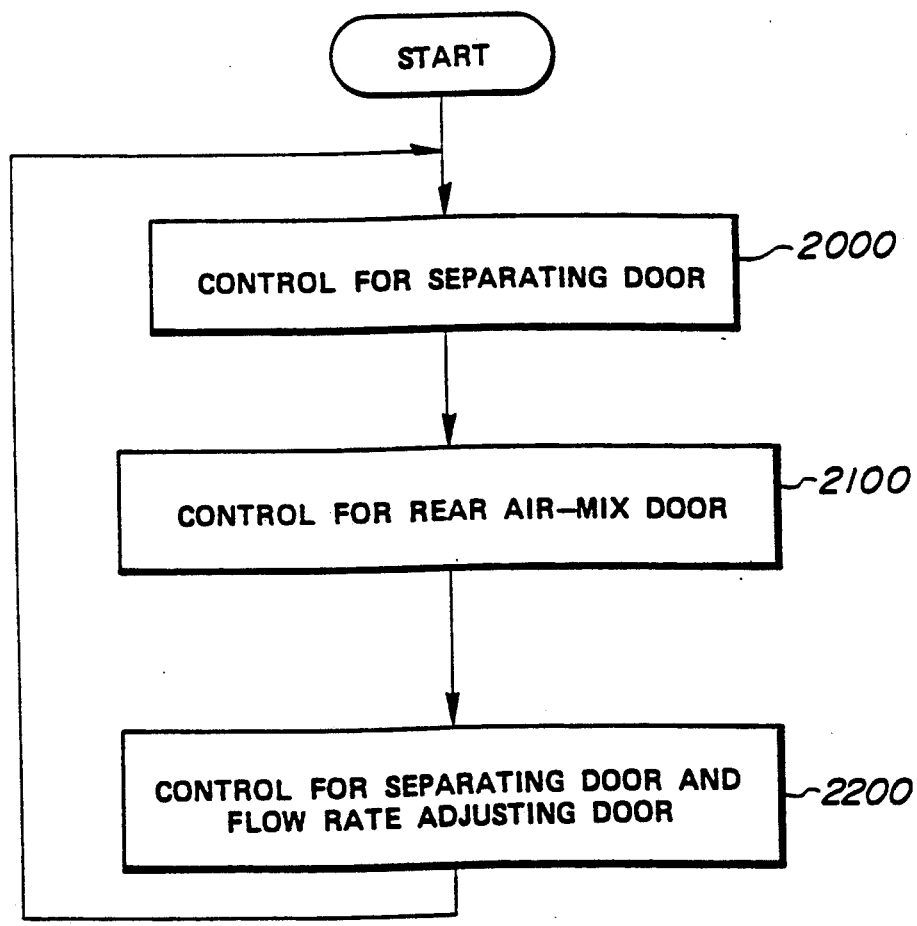
FIG. 20 a flow chart showing a process for controlling the air conditioner system of FIG. 1 by the rear control unit of FIG. 9.

FIG. 20 shows a fundamental control process of the rear control unit 92 according to the present invention. At step 2000, the separating door 72 and the flow rate adjusting door 74 is controlled. Next, at step 2100, the rear air-mix door 56 is controlled. Then, at step 2200, opening angle of the selecting door assembly 80 is controlled.

Figure 21:
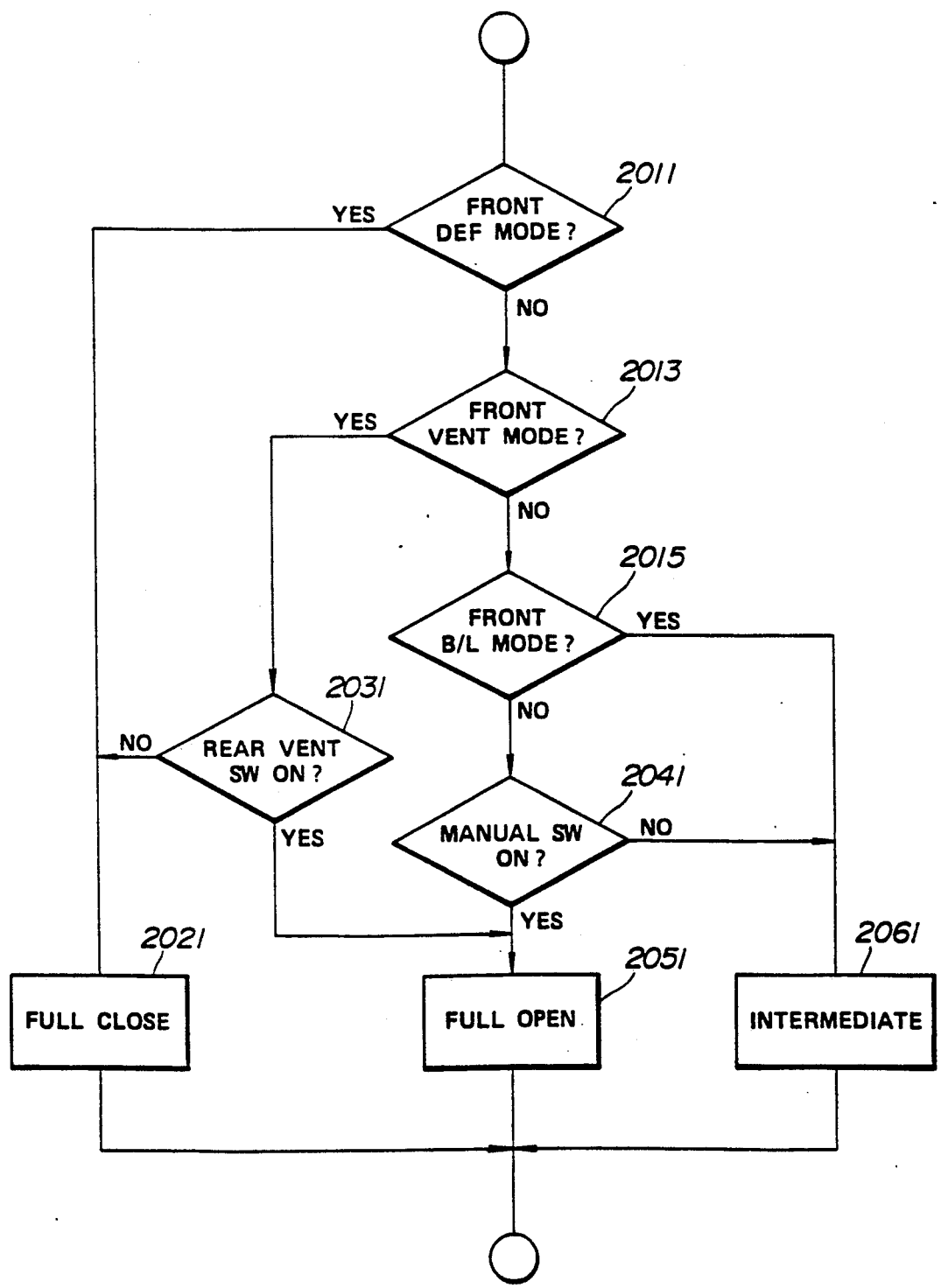
FIG. 21 is a flow chart of a control program for controlling a separating door of the air conditioner system of FIG. 1 in the process of FIG. 20.

FIG. 21 shows a control program of the separating door 72 according to the present invention. At steps 2011, 2013 and 2015, the front discharge nozzle mode is judged in accordance with 3-bit feedback signal supplied by the encoder 136. At step 2011, when it is estimated that the front discharge nozzle mode is DEF mode, the routine goes to step 2021 in which the fully open operation mode is set. In the full close mode, the separating door 72 is positioned at the position P16 so that the opening 70 is open and the rear air passage 50 is closed. Therefore all of the air is discharged from the front discharge nozzles. On the other hand, when the front discharge nozzle mode is not DEF mode, the routine goes from step 2011 to step 2013 in which it is determined whether or not the front discharge nozzle mode is VENT. If it is the VENT mode, the routine goes to step 2031 in which it is determined whether or not either the rear vent switch 156 or 194 is ON. When both of the rear vent switch 156 and 194 are OFF, the routine goes to step 2021 so that the operation mode is set as the fully closed mode. On the other hand, when the either the rear vent switch 156 or 194 is ON, the routine goes from step 2031 to step 2051 in which the operation mode is set as the fully open mode. In the fully open mode, the separating door 72 is set at the position P15 and the flow rate adjusting door 74 is set at the position P18. At step 2013, when it is judged that the front discharge nozzle mode is not VENT, the routine goes from step 2013 to step 2015 in which whether or not the front discharge nozzle mode is BI-LEVEL is judged. When the front discharge nozzle mode is BI-LEVEL mode, the routine goes to step 2061, so that the operation mode is set as the intermediate mode. In the intermediate mode, the separating door 72 is positioned at the position P15 and the flow rate adjusting door 74 is positioned at the position P17. As a result, the amount of air passing through the rear air passage 50 is decreased by the flow rate adjusting door 74, so that the air discharged from the rear discharge nozzles is decreased compared to that in the fully open mode, and the air discharged from the front discharge nozzles increases. At step 2015, when it is judged that the front discharge nozzle mode is not BI-LEVEL, i.e. when the front discharge nozzle mode is HEAT, the routine goes from step 2015 to step 2041 in which whether or not the manual switch 154 for preferentially heating the back seat is ON is estimated. If the manual switch 154 is ON, the routine goes to step 2051 so that the full open mode is set. On the other hand, if the manual switch 154 is OFF, the routine goes to step 2061 in which the system is set in the intermediate mode.

Figure 22:
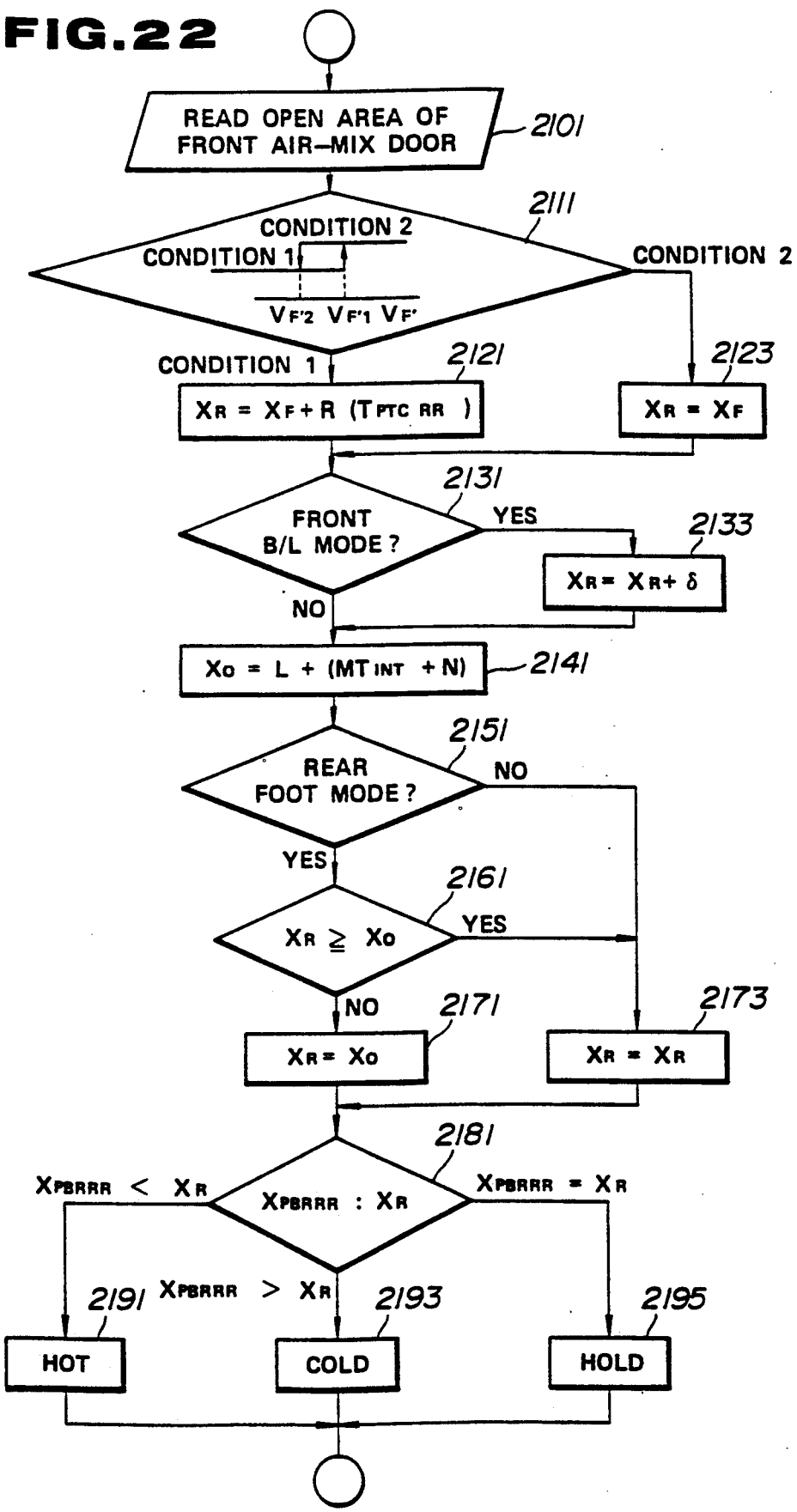
FIG. 22 is a flow chart of a control program for controlling a rear air-mix door of the air conditioner system of FIG. 1 in the process FIG. 20.
Figure 23:
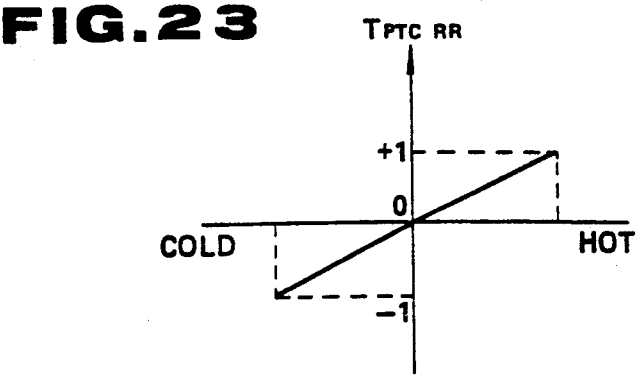
FIG. 23 is a graph of the relationship between the position of a manual switch for the fine adjustment of the set temperature in the back seat and the set temperature $T_{PTCRR}$ set by the manual switch.

FIG. 22 shows the control program for the rear air-mix door at step 2100 in FIG. 20. At step 2101, the actual opening angle signal of the front air-mix door 54 is read. Then, at step 2111, operation condition of the blower 24 is estimated on the basis of the impressed voltage applied to the blower 24. That is, if the impressed voltage $V_F'$ applied to the blower 24 is increasing until it reaches a predetermined voltage $V_F'1$ (V), it is determined that the operation condition of the blower 24 is the stable operating condition 1, and the routine goes from step 2111 to step 2121. On the other hand, if the impressed voltage $V_F'$ applied to the blower 24 is decreasing until it reaches a predetermined voltage $V_F'2$ (V), it is determined that the operation condition thereof is the condition 2 in which rapid cooling is occuring, and the routine goes from step 2111 to step 2123. At step 2121, opening angle $X_R$ of the rear air-mix door 56 is calculated with reference to a correction coefficient R relative to the opening angle $X_F$, and the set temperature $T_{PTCRR}$ set by the manual switch 192 for the fine adjustment of the set temperature in the back seat. As shown in FIG. 23, the set temperature $T_{PTCRR}$ set by the manual switch 192 is set to be zero when the manual switch 192 is positioned at the center, and can be changed between $-1$ and $+1$ in accordance with the position of the manual switch 192. At step 2123, the opening angle $X_R$ of the rear air-mix door 56 is set to be equal to the opening angle $X_F$ of the front air-mix door 54. The routine then goes from step 2121 or 2123 to step 2131 in which whether or not the front discharge nozzle mode is BI-LEVEL mode is estimated. When the front discharge nozzle mode is BI-LEVEL, the routine goes from step 2131 to step 2133. When in BI-LEVEL mode, more cool air bypasses the heater core 52 and is discharged from the front vent nozzle 60, so that the temperature of the air discharge from the front vent nozzle 60 is less than that discharged from the front foot nozzle. As a result, the vehicular occupant may get warm air at his feet and be cool air near his head. However, when the air is discharged from the rear discharge nozzles 76 and 78, the air passing through the heater core 52 becomes sufficiently mixed with the air bypassing the latter due to the long air passage between the rear discharge nozzles 76 and 78 and the heater core 52. As a result, the air passing through the rear air passage 50 is cooled, so that the discharged air temperature may be lower than the required discharge air temperature which was calculated. Therefore, at step 2133, the rear air-mix door 56 is moved in a direction of the position P7, so that the opening angle $X_R$ thereof becomes greater than the $X_R$ set at step 2123 by $\delta$. At step 2131, when it is estimated that the front discharge nozzle mode is not BI-LEVEL, the routine goes from step 2131 to step 2141 in which opening angle $X_0$ of the rear air-mix door 56 for setting temperature of the air discharged from the rear discharge nozzles 76 and 78 to a predetermined temperature $T_{30}$, is calculated on the basis of the inlet air temperature data $T_{INT}$ obtained by the inlet air temperature sensor 114. The temperature $T_{30}$ means the minimum temperature of an to be discharged from the rear. That is, the temperature $T_{30}$ means a temperature which the vehicular occupant may find uncomfortable when air blown against his feet is equal to or less than the temperature $T_{30}$. This temperature $T_{30}$ may be previously set to an appropriate value. In the equation of L, M and N are constants, and M and N are preset on the basis of the inlet air temperature $T_{INT}$. Thereafter, the routine goes from step 2141 to step 2151 in which whether or not the rear discharge nozzle is in the foot mode is estimated. When the rear discharge is in the foot mode, the routine goes from step 2151 to step 2161 in which the opening angle $X_R$ of the rear air-mix door 56 calculated at steps 2121, 2123 or 2133 is compared with the opening angle $X_0$ calculated at step 2141. When the value $X_R$ is less than the value $X_0$, i.e. when the temperature of the air discharged from the rear discharge nozzles is lower than the temperature $T_{30}$, the routine goes to step 2171 wherein the opening angle $X_R$ of the rear air-mix door 56 is set at the opening angle $X_0$ calculated at step 2141. At step 2151, if it is estimated that the rear discharge nozzle mode is not FOOT, i.e. that the air is discharged from only the rear vent nozzle 76, or from both of the rear vent nozzle and rear foot nozzles 78, the routine goes from step 2151 to step 2173. At step 2161, if it is estimated that the value $X_R$ is greater than the value $X_0$, the routine goes from step 2161 to step 2173. At step 2173, the opening angle $X_R$ of the rear air-mix door 56 is set to be the same value as that calculated at steps 2121, 2123 or 2133. Thereafter, the routine goes from step 2171 or 2173 to step 2181 in which the opening angle signal $x_{PBRRR}$ indicative of the actual opening angle of the rear air-mix door 56, which is produced from the rear air-mix door actuator 184 shown in FIG. 9, is compared with the opening angle $X_R$ of the rear air-mix door 56 determined by the rear control unit 92. When the opening angle signal $X_{PBRRR}$ is less than the opening angle $X_R$, the routine goes to step 2191 in which the rear air-mix door 56 is moved toward the hot position, i.e. the position P7. When the opening angle signal $X_{PBRRR}$ is greater than the opening angle $X_R$, the routine goes to step 2193 in which the rear air-mix door 56 is moved in a direction of the cold position, i.e. the position P6. When the opening angle signal $X_{PBRRR}$ is equal to the opening angle $X_R$, the routine goes to step 195 in which the rear air-mix door is not moved.

Figure 24:
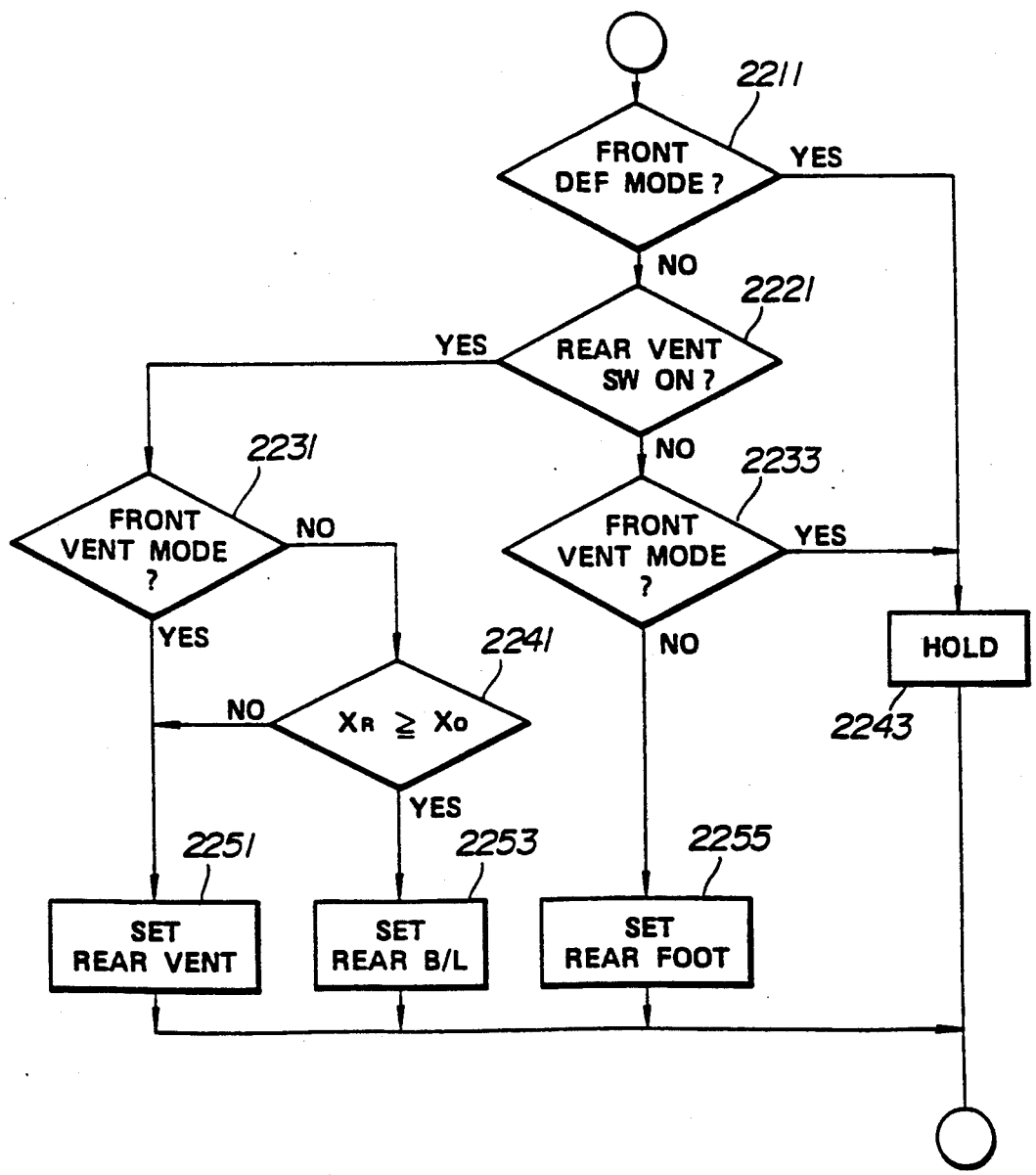
FIG. 24 is a flow chart of a control program for controlling a selecting door assembly of the air conditioner system of FIG. 1 in the process of FIG. 20.

FIG. 24 shows a control program of the selecting door assembly 80 at step 2200 in FIG. 20. At step 2211, whether or not the front discharge nozzle mode is DEF is determined. When the front discharge nozzle mode is not DEF, the routine goes to step 2221 in which whether or not either of the rear vent switches 156 or 194 is ON is determined. If either of the rear vent switches 156 or 194 is ON, the routine goes to step 2231 in which whether or not the front discharge nozzle mode is VENT is determined. If the front discharge nozzle mode is VENT, the routine goes from step 2231 to step 2251 in which the rear VENT mode is set, i.e. the selecting door assembly 80 is positioned at the position P22 so that air is discharged from only the rear vent nozzle 76. At step 2231, if the front discharge nozzle mode is not VENT, i.e. when it is BI-LEVEL or HEAT, the routine goes from step 2231 to step 2241 in which the discharged air temperature is determined. The decision made at step 2241 is same as that at step 2161 in FIG. 22. When $X_R < X_0$, the routine goes from step 2241 to step 2251 in which the air introduced into the rear air passage 50 is caused to be discharged from only the rear vent nozzle 76. Therefore, when temperature of the air discharged to the back seat is lower than the the predetermined $T_{B0}1$. Rear foot nozzles 78 are closed so as to prevent cool air from being blown against the feet of occupant on the back seat. On the other hand, when $X_R \geq X_0$, the routine goes from step 2241 to step 2253 in which the rear duct system is set in the rear BI-LEVEL mode, i.e. the selecting door assembly 80 is moved into the position P21 so that air is discharged from both of the rear vent nozzle 76 and the rear foot nozzles 78.

At step 2221, when both of the rear vent switches 156 and 194 are OFF, the routine goes from step 2221 to step 2233 in which whether or not the front discharge nozzle mode is VENT is determined. When the front discharge nozzle mode is not VENT, i.e. when it is BI-LEVEL or HEAT, the routine goes to step 2255 in which the rear duct system is set in the rear FOOT mode, i.e. the selecting door assembly 80 is positioned at the position P20, so that the rear vent nozzle 76 is closed, thereby the air is discharged from only the rear foot nozzles 78. At step 2211, if the front discharge nozzle mode is DEF, the routine goes from step 2211 to step 2243. At step 2233, the front discharge nozzle mode is VENT, the routine goes from step 2233 to step 2243. At step 2243, the selecting door assembly 80 is not moved.

What is claimed is:

1. An air conditioning system for an automotive vehicle comprising:

air passage means defining an air path which branches into front and rear air paths, said front air path including front vent and front foot air outlets which open to a vehicular cabin near the front seat for discharging conditioned air into said vehicular cabin in the vicinity of the front seat, and said rear air path including rear vent and rear foot air outlets which open to said vehicular cabin in the vicinity of the back seat;

air conditioning means disposed within said air passage means, said air conditioning means including a cooling unit for cooling the air flowing through said air passage means and a heating unit for heating the air flowing through said air passage means, said cooling and heating units cooperatively generating conditioned air of a desired temperature, said air conditioning means including front and rear air-mix doors for changing front and rear path areas, through which air is introduced into said heating unit, each of said front and rear air-mix doors being movable between a fully open position at which the corresponding path area is maximum and a fully closed position at which the corresponding path area is minimum so that the temperature of the conditioned air passing through said front and rear paths increases as the opening angles of the front and rear air-mix doors increase;

a first detecting means for monitoring an actual opening angle of said rear air-mix door to produce a signal ($X_{PBRRR}$) representative of said actual opening angle of said rear air-mix door;

a second detecting means for monitoring an intake air temperature ($T_{INT}$) defined by the temperature of air flowing through an evaporating unit as measured just behind said evaporating unit, to produce an intake air temperature indicative signal;

inhibiting means associated with said air conditioning means, for comparing the signal value representative of said actual opening angle of said rear air-mix door with a target opening angle of said rear air-mix door, to correct the opening angle of said rear air-mix door, said target opening angle of said rear air-mix door being derived in such a manner as to be maintained at a value greater than a lower limit of said rear air-mix door opening-angle, whose lower limit is determined on the basis of said intake air temperature indicative signal value, such that a temperature of conditioned air discharged from said rear foot air outlet of said rear air path is maintained at a level greater than a predetermined temperature criterion ($T_{30}$).

2. An air conditioning system as set forth in claim 1, which further comprises a rear vent door associated with said rear vent air outlet of the rear air path operable between a closed position in which said rear vent door fully closes said rear vent air outlet and an open position in which said rear vent door fully opens said rear vent air outlet, and a rear foot door associated with said rear foot air outlet of the rear air path operable between a closed position in which said rear foot door fully closes said rear foot air outlet and an open position in which said rear foot door fully opens said rear foot air outlet.

3. An air conditioning system as set forth in claim 2, which further comprises a front vent door associated with said front vent air outlet of the front air path operable between a closed position in which said front vent door fully closes said front vent air outlet and an open position in which said front vent door fully opens said front vent air outlet, and a front foot door associated with said front foot air outlet of the front air path operable between a closed position in which said front foot door fully closes said front foot air outlet and an open position in which said front foot door fully opens said front foot air outlet.

4. An conditioning system as set forth in claim 3, wherein said inhibiting means controls the path area defined by said rear air-mix door to increase the temperature of air passing through said rear air path, when the air conditioning system operates in a mode in which said front vent and foot doors open and said rear foot door opens and said rear vent door is closed.

5. An air conditioning system as set forth in claim 1 which further comprises a manually operable rear vent switch for causing the air conditioning system to operate in a mode in which said rear vent door opens and said rear foot door is closed, in response to the turning ON of said switch.

6. An air conditioning system as set forth in claim 5, wherein said inhibiting means causes said rear foot door to close, when said rear vent switch is turned ON.

7. An air conditioner system as set forth in claim 1, which further comprises a front vent door associated with said front vent air outlet of the front air path operable between a closed position in which said front vent door fully closes said front vent air outlet and an open position in which said front vent door fully opens said front vent air outlet, and a front foot door associated with said front foot air outlet of the front air path operable between a closed position in which said front foot door fully closes said front foot air outlet and an open position in which said front foot door fully opens said front foot air outlet.

8. An air conditioner system as set forth in claim 7, wherein said inhibiting means causes the path area defined by said rear air-mix door to increase so as to increase the temperature of the air passing through said rear air path, when the air conditioner system operates in a mode in which said front vent and foot doors open and in which said rear foot door opens and said rear vent door is closed.

9. An air conditioning system as set forth in claim 1, wherein said inhibiting means comprises:
   means for primarily deriving said target opening angle of said rear air-mix door, depending upon the opening angle of said front air-mix door;
   means responsive to said intake air temperature indicative signal, for determining said lower limit ($X_o$) of said target opening angle of said rear air-mix door, such that the temperature of conditioned air discharged from said rear foot air outlet of said rear air path exceeds said predetermined temperature criterion ($T_{30}$);
   means for secondarily deriving said target opening angle of said rear air-mix door, in such a manner as to select a maximum value out of said lower limit ($X_o$) and said primarily derived target opening angle while comparing said primarily derived target opening angle with said lower limit; and
   means responsive to said actual opening angle indicative signal and the secondarily derived target opening angle for controlling said actual opening angle ($X_{PBRRR}$), such that said actual opening angle approaches the secondarily derived target opening angle of said rear air-mix door.

10. An air conditioning system as set forth in claim 9, wherein said inhibiting means including means for causing said rear foot door to close said rear foot air outlet when said primarily derived opening angle of said rear air-mix door is lower than said lower limit ($X_o$) of said target opening angle of said rear air-mix door.

11. An air conditioning system as set forth in claim 9, wherein said primarily deriving means determines said primarily derived target opening angle of said rear air-mix door on the basis of the opening angle of said front air-mix door and a predetermined temperature input by temperature setting means for setting a desirable set temperature in the back seat.

* * * * *